May 7, 1935. L. O. CARLSEN 2,000,215
MACHINE FOR PRODUCING GEARS
Filed Feb. 27, 1932 11 Sheets-Sheet 1

INVENTOR
Leonard O. Carlsen
BY
his ATTORNEY

May 7, 1935. L. O. CARLSEN 2,000,215
MACHINE FOR PRODUCING GEARS
Filed Feb. 27, 1932  11 Sheets-Sheet 3

INVENTOR
Leonard O. Carlsen
BY
his ATTORNEY

May 7, 1935.  L. O. CARLSEN  2,000,215
MACHINE FOR PRODUCING GEARS
Filed Feb. 27, 1932  11 Sheets-Sheet 5

INVENTOR
Leonard O. Carlsen.
BY
his ATTORNEY

May 7, 1935.  L. O. CARLSEN  2,000,215
MACHINE FOR PRODUCING GEARS
Filed Feb. 27, 1932   11 Sheets-Sheet 7

INVENTOR
Leonard O. Carlsen
BY
his ATTORNEY

May 7, 1935.  L. O. CARLSEN  2,000,215
MACHINE FOR PRODUCING GEARS
Filed Feb. 27, 1932  11 Sheets-Sheet 10

INVENTOR
Leonard O. Carlsen.
BY
his ATTORNEY

Patented May 7, 1935

2,000,215

UNITED STATES PATENT OFFICE 2,000,215

MACHINE FOR PRODUCING GEARS

Leonard O. Carlsen, Rochester, N. Y., assignor to Gleason Works, Rochester, N. Y., a corporation of New York Application February 27, 1932, Serial No. 595,558

25 Claims. (Cl. 90—4)

The present invention relates to machines for producing gears and in a particular aspect to machines for generating longitudinally curved tooth bevel and hypoid gears.

One object of the invention is to provide a spiral bevel and hypoid gear generator which will be more compact and rigid in construction. For this purpose, improvements have been made in the tool end of the machine which enable the required large number of cutter adjustments to be made in a very compact space and which, at the same time, make it possible to hold the cutter rigidly against chatter or vibration when in operation. For this purpose, too, the work head is mounted on a sliding base that is adjustable in the direction of the axis of the cradle so that adjustment of the work may be used to avoid in large part the necessity for axial adjustment of the cutter spindle with the result that extreme overhang of the cutter spindle is avoided.

Another object of the invention is to make it possible to operate spiral bevel and hypoid generators and gear-cutting machines of the intermittent indexing type generally at faster speeds but still with greater quietness. To this end, improved indexing and reverse mechanisms have been developed. These operate with a slow start and stop and in such way that both the beginning and end of the respective operations are cushioned. Thus both reversal and indexing can be effected more rapidly and still without jar or noise.

The invention has been illustrated as embodied in a machine for generating spiral bevel and hypoid gears. Mention will be made briefly now of the new features of this machine and then a more detailed description of each will be given.

In this machine, instead of mounting the cutter, as usual, on an open cradle which oscillates in a dished bed, a full circular cradle with a full circular bearing therefor has been provided. Thus the cutter is held with the same rigidity at all points of the generating roll and more accurate, smoother-surfaced gears can be cut.

Whenever spiral bevel or hypoid gears are to be cut, the cutter must be adjusted relative to the work in accordance with the spiral angle of the gear to be cut. In addition, in order to cut hypoid gears, in order to cut spiral bevel and hypoid gears of different pressure angles with the same face-mill gear cutter, and in order to cut spiral bevel or hypoid gears conjugate to non-generated mating gears, all on the same machine, two angular adjustments of the cutter are required. Then, means should be provided for adjusting the cutter relative to the work to compensate for the change in the height of the blades after each sharpening. All of these adjustments have been provided in the present machine but through improvement in the mounting of the cutter on the cradle, greater compactness and rigidity have been attained. In the present machine, the cutter spindle is mounted so as to be axially adjustable in a swivel-head that is angularly adjustable on a carrier which is, in turn, adjustable angularly at right angles on a slide that is radially adjustable on the cradle. The whole makes a very sturdy construction.

When a face-mill gear cutter is adjusted angularly on its cradle, the distance of the point of cut from the center about which the cutter adjusts changes. Heretofore spiral bevel and hypoid gear generators have been built with a swinging work head base. On these prior machines, it was necessary to adjust the cutter axially, whenever an angular adjustment of the cutter had been made, in order to bring the cutter and work into operative relation. The swinging base could not be adjusted for this purpose, for adjustment of the swinging base would change the angle between the axes of the work and cradle and that would result in a gear of the wrong pitch cone angle being produced. This necessity for axial adjustment of the cutter spindle on angular adjustment of the cutter has required heretofore, however, that provision be made for a very long adjustment for this spindle and in cases of large angular adjustment, the cutter spindle has had to be adjusted so far that the cutter has overhung beyond the cradle to an excessive degree with the result that it has been impossible to support the cutter as rigidly as might be desired against vibration and chatter. In the machine of the present invention, as mentioned, the work head is mounted on a sliding instead of a swinging base. This base is adjustable in the direction of the axis of the cradle. With this construction, after an angular adjustment of the cutter, the sliding base instead of the cutter can be adjusted to bring the work and cutter into operative relation, for adjustment of the sliding base does not change the desired angular relation of the work and cradle axes. Hence through provision of a sliding base, it is unnecessary to provide for any more adjustment of the cutter spindle than that required to compensate for reduction in the height of the blades of the cutter with repeated sharpenings, and conditions of excessive overhang of the cutter are eliminated entirely. As will be pointed out later, too, the use of the sliding base enables the machine to be operated more rapidly without noise or jar.

In the reverse mechanism of the machine, oil or a similar medium is used to cushion reversal. A hollow drum containing oil or a suitable liquid is secured to the driven shaft. Each of the two oppositely rotating drive gears is provided with a lug or projection that extends into the drum and the drum carries oppositely directed dogs that are adapted to engage alternately with the two lugs thereby to cause the alternate drive in opposite directions. The shock of reversal is eliminated by causing the speed of movement of the relatively rotating parts to be gradually reduced, just prior to engagement, through controlled escape of oil between the lug or projection next to drive and the corresponding dog.

In the index mechanism, oil or a similar liquid is again used as a cushioning medium. The continuously rotating shaft, which produces the indexing motion, is provided with a lug or arm that extends into a drum which is secured to one of two gears that serve to transmit rotation between the continuously rotating shaft and the differential housing during indexing. The other gear is secured to another drum that is provided with dogs which extend into this drum and are adapted to engage an arm or plate which is secured to the differential housing and which also extends into this second drum. As in prior types of indexing mechanisms used on bevel and hypoid gear generators, the differential housing is held against rotation during actual cutting by engagement of the dogs which are mounted on the second drum with the arm or plate secured to the differential housing. As in prior constructions, also, the indexing is effected by releasing the differential housing and connecting the continuously rotating shaft to it through engagement of pawls carried by the first mentioned gear with the lug or arm secured to the continuously rotating shaft. As in prior indexing mechanisms, also, when the indexing has been completed, the continuously rotating shaft is disconnected from the differential and the differential is again locked against rotation. The index mechanism of the present invention is novel, however, in the provision of means for cushioning both the connection of the driving shaft to the differential at the beginning of the indexing operation and the stoppage of the differential housing at the end of the indexing operation. The two drums provided contain oil or a suitable fluid and the connection of the continuously rotating shaft through the differential housing is gradual by reason of the entrapment and controlled escape of oil between the connecting pawls and the lug or arm provided on the continuously rotating shaft. Likewise, the stoppage of the differential is cushioned through entrapment and gradual escape of oil between the stop dogs and the lug or arm provided on the continuously rotating shaft.

This cushioning of the reverse and index mechanisms enables the machine to be driven at higher speeds and, by eliminating vibration, permits of turning out a better quality of work.

Figure 1:
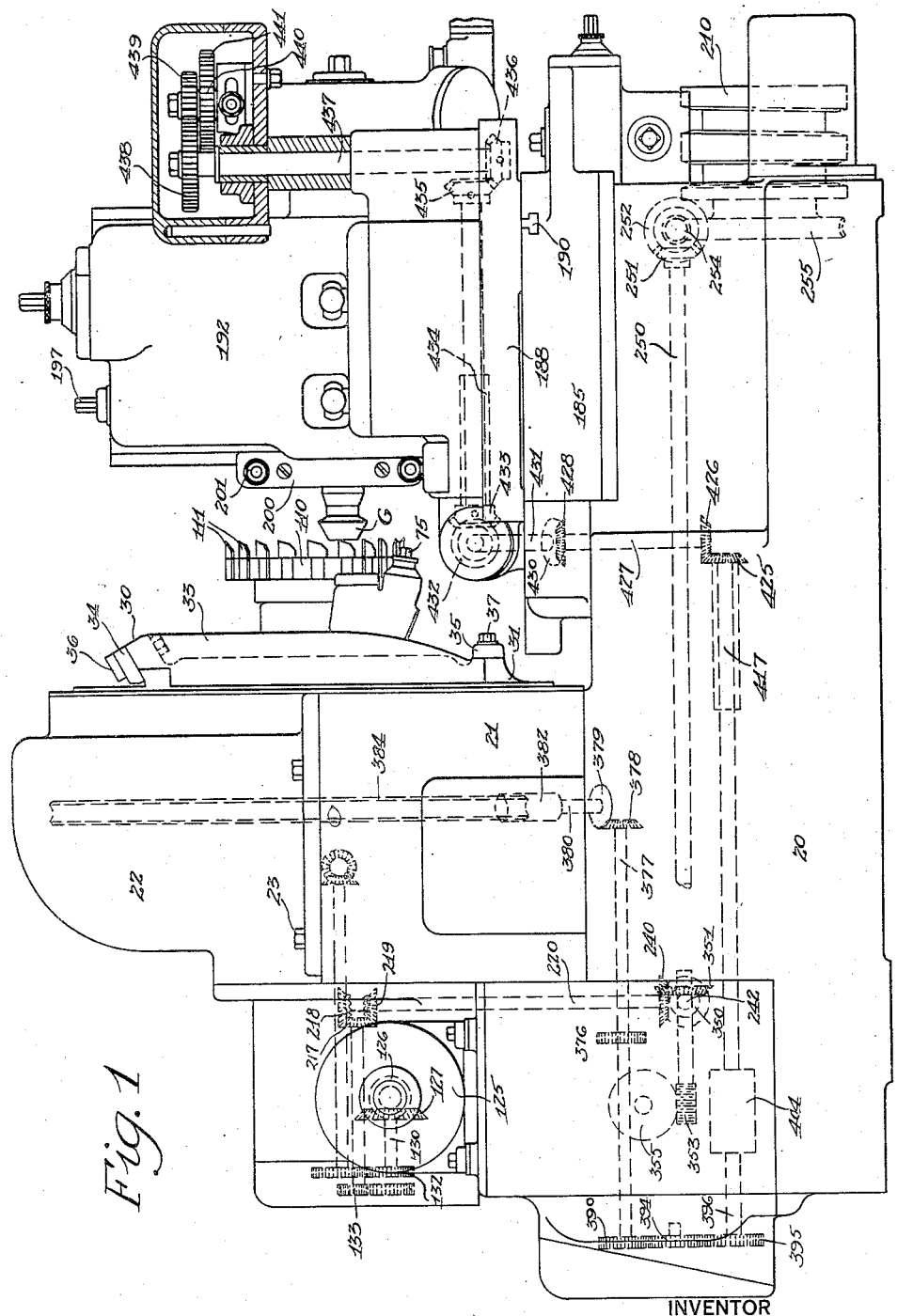
Figure 1 is a side elevation, with parts broken away, of a spiral bevel and hypoid gear generator constructed according to one embodiment of the present invention and incorporating in its construction the various improvements which constitute this invention.
Figure 2:
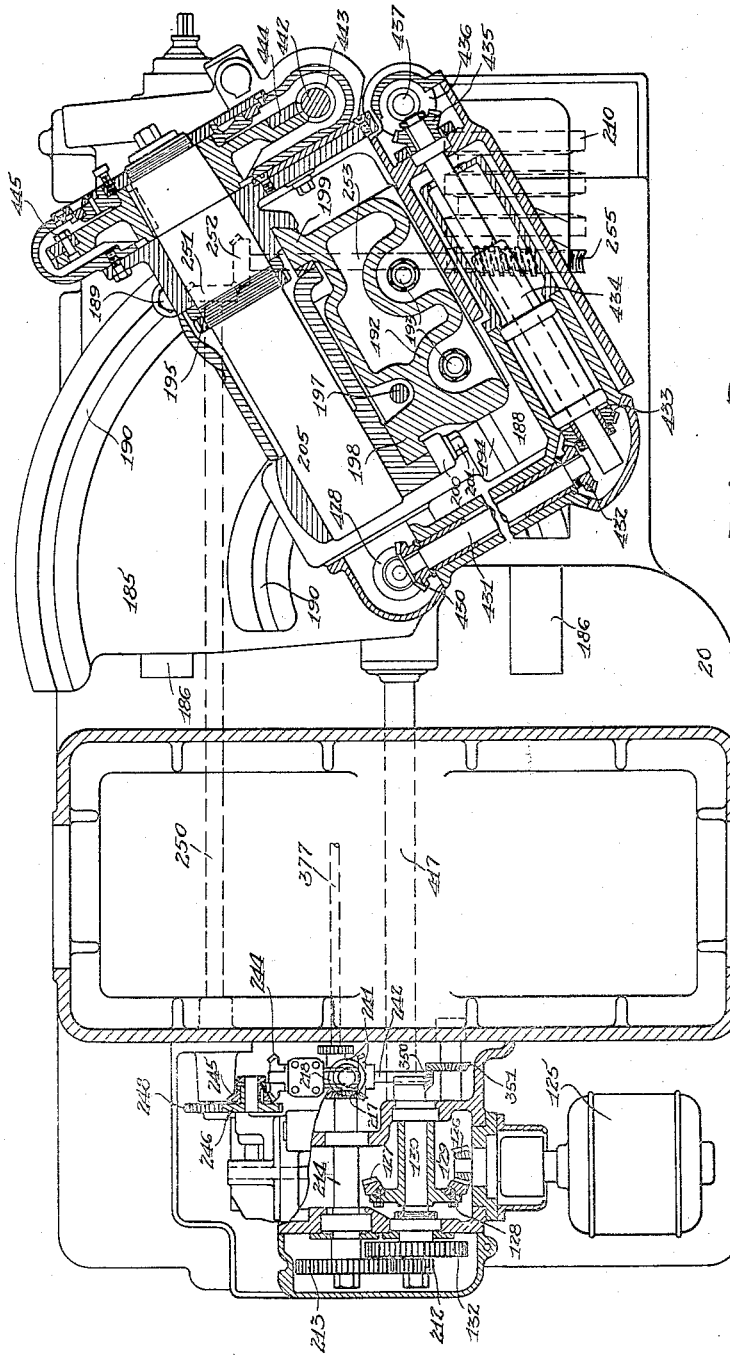
Figure 2 is a plan view of this machine, parts being broken away and shown in section.
Figure 4:
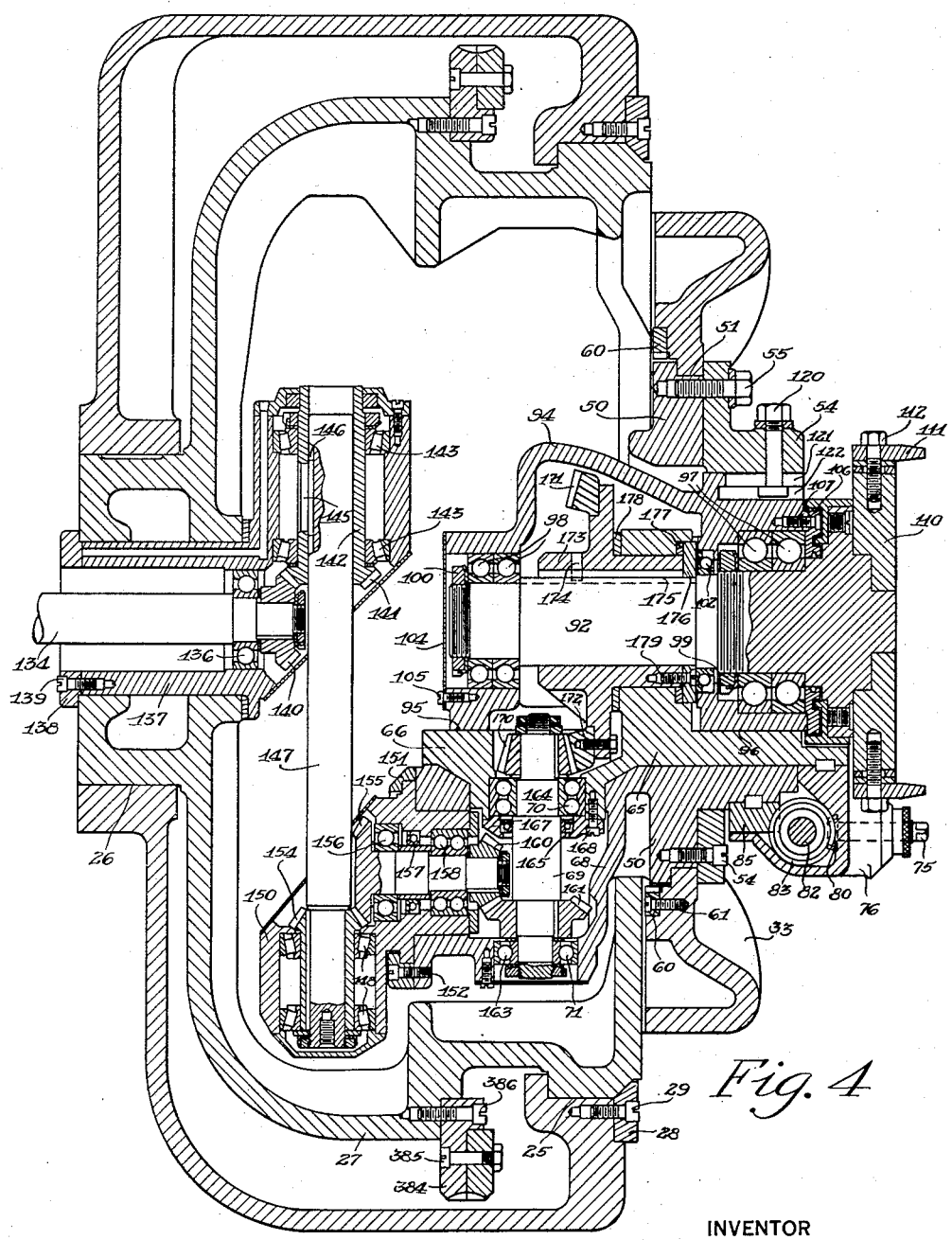
Figure 4 is a section on the line 4—4 of Figure 3.
Figure 5:
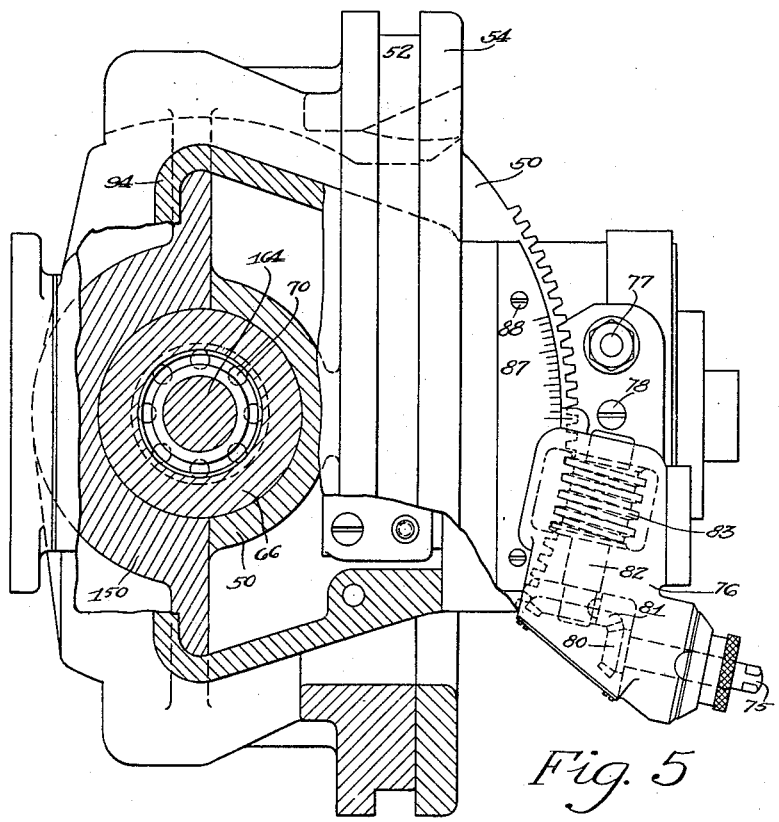
Figure 5 is an elevational view of the cutter swivel-head and its carrier, the view being at right angles to the section of Figure 4 and parts being broken away and shown in section.
Figure 6:
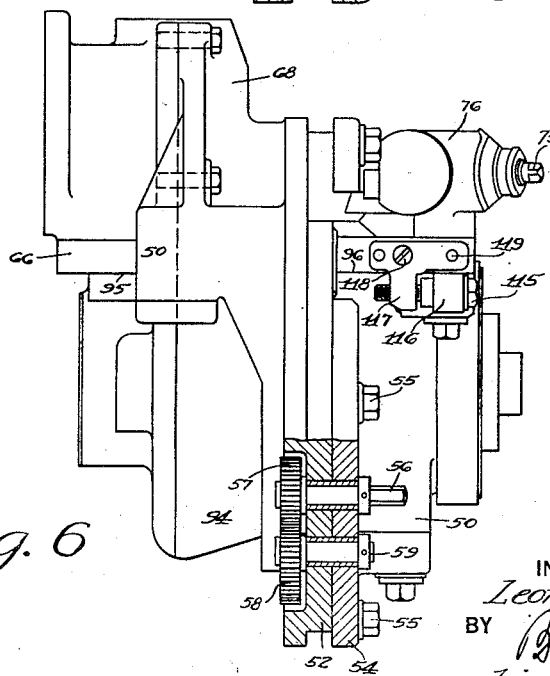
Figure 6 is a bottom plan view of the swivel-head and carrier.
Figure 16:
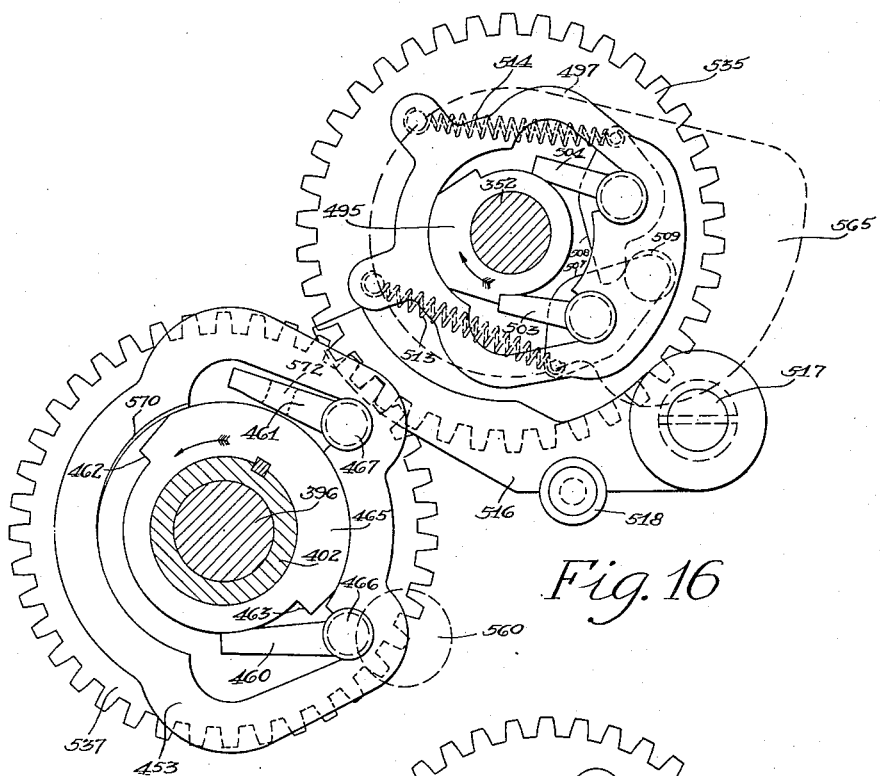
Figures 16 and 17 are more or less diagrammatic views of the index mechanism, showing successive positions of the parts at different times in the indexing operation.
Figure 17:
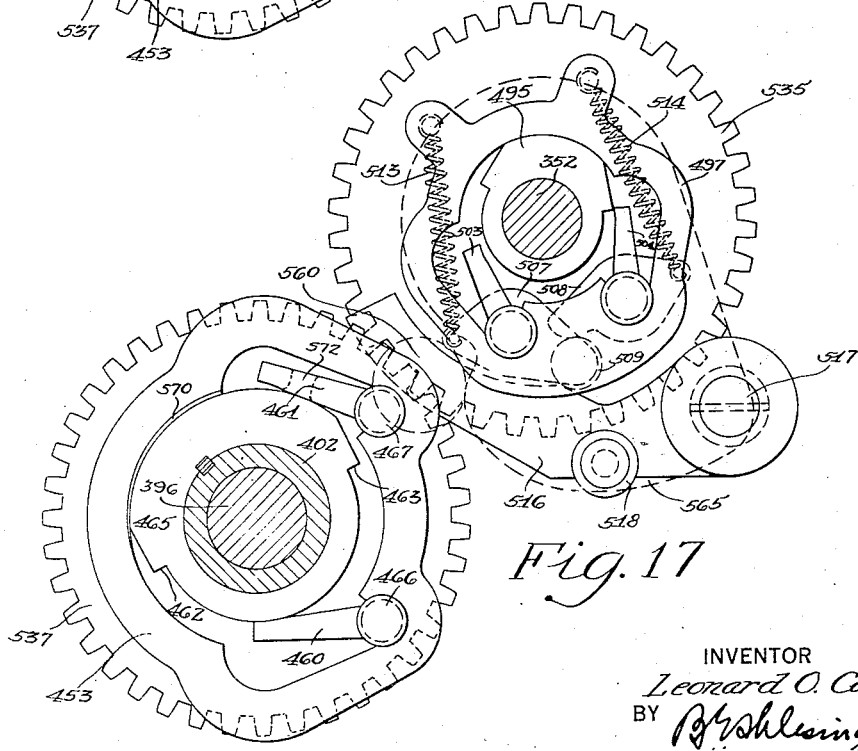

Figures 3 to 15 inclusive are all on an enlarged scale as compared with Figures 1 and 2, Figure 6 being on a slightly reduced scale, however, as compared with Figure 5. Figures 16 and 17 are on a still further enlarged scale.

20 designates the base or frame of the machine.

Figures 3, 15:
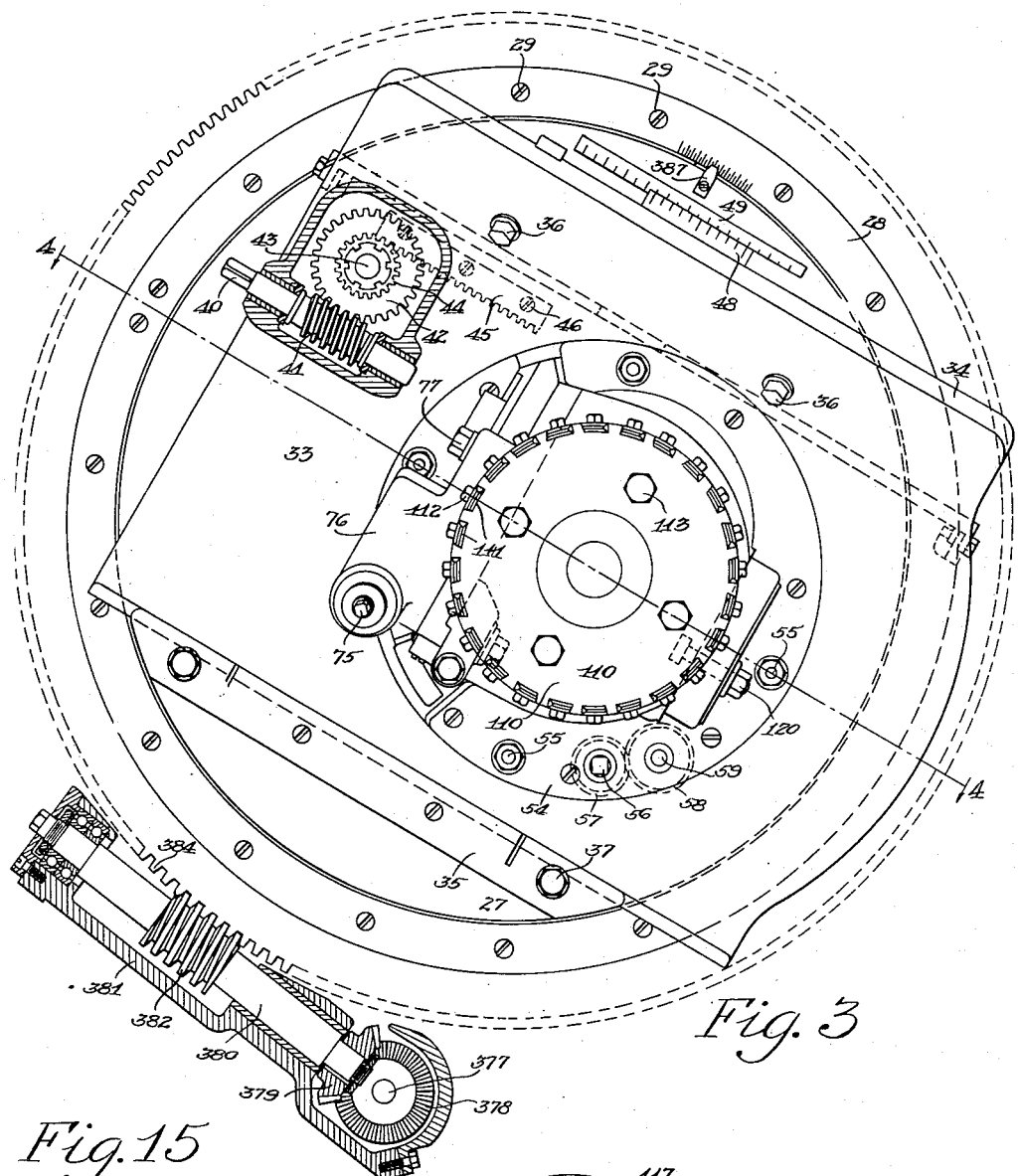
Figure 3 is a front end elevation of the cradle and cutter mounting.
Figure 15 is a section on the line 15—15 of Figure 10.

The cradle housing is mounted on the frame at one end thereof while a sliding base, which carries the work head, is slidably mounted on the frame at the other end thereof. The cradle housing is made in two parts for convenience of assembly. The lower portion 21 is secured to the frame 20 in any suitable manner, while the upper portion 22 which is in the form of a cap-member is secured to the lower portion by bolts 23. Each of the portions 21 and 22 has a substantially semi-circular front bearing or way and a substantially semi-circular rear bearing or way. When the two parts 21 and 22 are assembled, the front bearing portions constitute a full circular track or bearing 25 (Fig. 4) while the rear bearing portion constitutes a full circular bearing or track 26. The rear bearing or track 26 is much smaller in diameter than the front bearing or track 25. The cradle, which is designated at 27, is mounted to oscillate in the bearings 25 and 26. It is secured against axial movement in the housing by the circular gib or strap 28 (Figs. 3 and 4). This gib is secured to the housing by screws 29.

There are parallel guide-ways 30 and 31 formed on the front face of the cradle 27, (Figures 1 and 3). The slide 33, which is radially adjustable on the cradle, is mounted to slide on these ways 30 and 31. It is secured in any adjusted position by the gibs 34 and 35 and the bolts 36 and 37, the gib 34 and bolts 36 clamping the slide to the way 30 and the gib 35 and bolts 37 clamping the slide against the way 31.

Adjustment of the slide 33 on the cradle is effected by rotation of a stub shaft 40 which is journaled in the slide 33 and which is formed integral with the worm 41. The worm 41 meshes with a worm wheel 42 which is secured to a shaft 43 that is also journaled in the slide 33. There is a spur pinion 44 secured to the shaft 43 and this pinion meshes with a rack 45 that is secured by screws 46 to the face of the cradle 27.

A scale 48, which is secured to the gib 34, and and a vernier 49 which is secured to the face of the cradle are used to accurately position the slide 33.

The slide 33 is formed with a centrally located circular opening in which is mounted the cutter carrier 50. The circular opening in the slide 33 provides a circular way or bearing 51 in which the carrier 50 is rotatably adjustable (Fig. 4). The carrier is formed with a circular bearing-surface 52 which seats in the way or bearing 51 and the carrier is secured in any position of its rotatable adjustment on the slide 33 by the strap-member 54 and bolts 55. When the bolts are tightened up, the carrier 50 and strap-member 54 are drawn against opposite sides of the circular opening in the slide 33 to hold the carrier 50 rigidly in any position of its angular adjustment on the slide. The axis about which the carrier adjusts extends in the same direction as the axis of the cradle.

Adjustment of the carrier 50 on the slide 33 may be effected by rotation of the shaft 56 (Figs. 3 and 6) which is journaled in aligned openings in the strap-member 54 and carrier 50. This shaft carries a spur gear 57 which meshes with a spur gear 58 that is secured to a shaft 59 which is journaled in aligned openings in the strap-member 54 and carrier 50. The gear 58 meshes with an internal gear 60 (Fig. 4) that is secured by screws 61 to the slide or carriage 33. The axis of the gear 60 coincides with the axis about which the carrier 50 adjusts in the central opening in the slide or carriage 33.

The carrier 50 is in the general shape of a ring with a depending bracket-portion 68 extending from the rear thereof into the cradle (Figs. 4 and 5). In the central opening of the ring there is mounted the angularly adjustable swivel-head 65. This swivel head 65 has a bearing portion 66 that seats in the depending bracket portion 68 of the carrier 50. There is a shaft 69 journaled on anti-friction bearings 70 and 71 in the bearing portions 66 and 68, respectively. It is about the axis of this shaft 69 that the swivel head 65 has its angular adjustment on the carrier 50. The axis of the shaft 69 is at right angles to and intersects the axis about which the carrier 50 adjusts in the slide or carriage 33.

Angular adjustment of the swivel-head 65 in the carrier 50 is effected by rotation of the stub-shaft 75 (Figs. 4, 5 and 6) which is journaled in a bracket 76 that is secured by the bolts 77 and screws 78 to the swivel-head 65. There is a bevel pinion 80 secured to the shaft 75 and this pinion meshes with a bevel gear 81 that is keyed to the worm shaft 82. There is a worm 83 formed integral with the shaft 82. This meshes with a worm wheel segment 85 that is keyed to the carrier 50 at one side thereof. There is a plate 87 secured by screws 88 to the worm wheel segment 85 (Fig. 5). This plate is graduated to provide a scale by means of which the swivel-head can be adjusted accurately in the carrier.

The cutter spindle 92 is journaled in a sliding member 94 that is mounted on the swivel head 65 and serves with the swivel head to enclose the cutter spindle and its bearings. The member 94 is adjustable on the swivel head in a direction axial of the cutter spindle. This member 94 has spaced bearing portions 95 and 96 that rest upon the upper face of the swivel head. The cutter spindle 92 is mounted in the member 94 on front and rear anti-friction bearings 97 and 98. These are secured against spaced shoulders on the cutter spindle by nuts 99 and 100, respectively. An oil seal is provided as indicated at 102. A rear cover plate 104 is secured by screws 105 to the slidable member 94 to prevent dirt or grit from getting into the rear bearings 87, while a labyrinth-seal 106 is provided to protect the front bearings 97. This seal is secured to the sliding-member 94 by screws 107.

The cutter 110 is a face-mill gear cutter of standard construction. It is provided with a plurality of cutting blades 111 which are circumferentially arranged and which are secured to the cutter head by screws or bolts 112. The cutter is secured to the cutter spindle 92 by bolts 113.

After sharpening, the cutter must be adjusted axially to compensate for the reduced height of the cutting blades. This axial adjustment is effected by rotation of the screw 115 (Fig. 6) which is rotatable in a lug 116 formed integral with the slidable member 94 and which threads into a lug 117 that is secured by the screw 118 and dowel-pins 119 to the swivel-head 65.

The supporting member 94 is held in any position of its combined axial and angular adjustment by the T-bolt 120 (Fig. 4). This bolt is secured in the part 54. Its stem passes through a straight slot 121 in the supporting-member 94 and its head engages in an arcuate T-slot 122 also formed in the supporting member 94. The straight slot 121 extends parallel to the axis of the cutter spindle while the arcuate slot 122 is parallel to the peripheral surface of the worm gear segment 85.

Figures 7, 14:
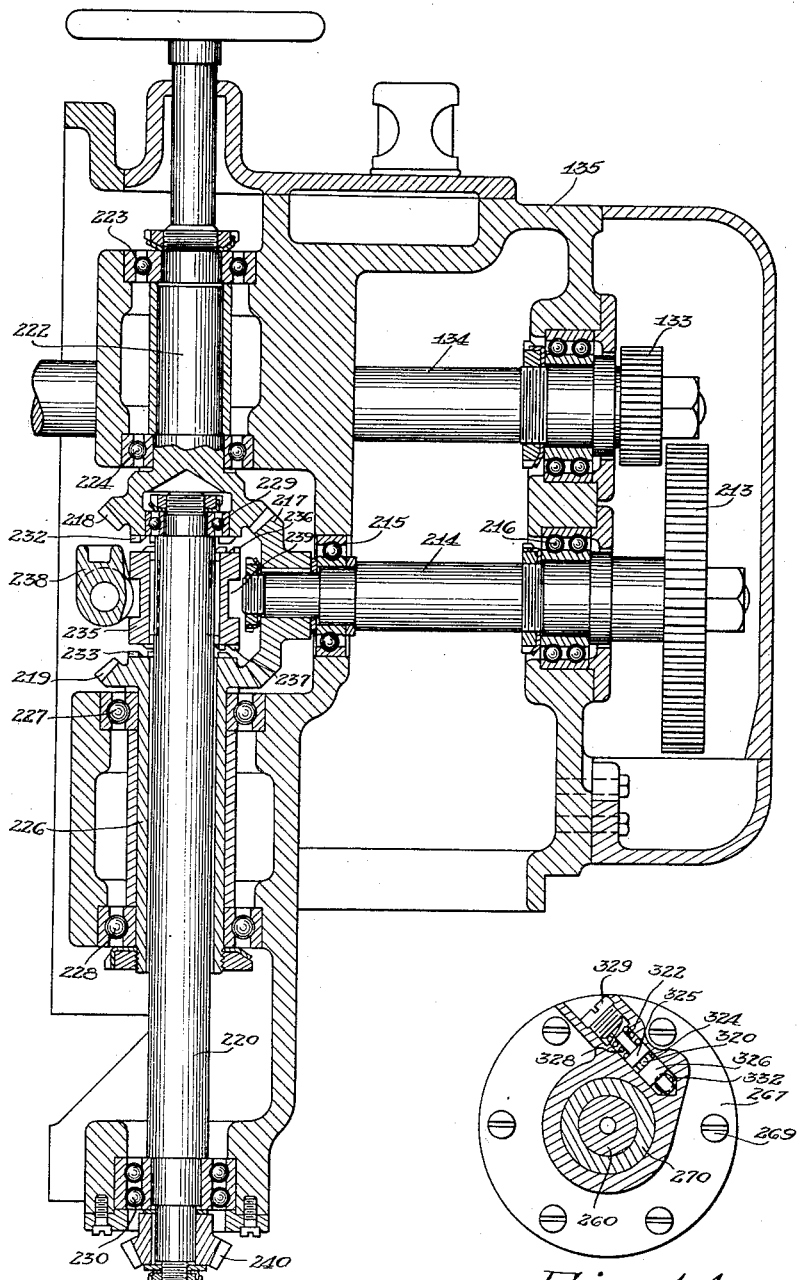
Figure 7 is a sectional view showing details of the machine drive, the section being taken in a vertical plane.
Figure 14 is a section on the line 14—14 of Figure 11.

During the operation of the machine, the cutter, as usual, rotates continuously on its axis. The cutter is driven by the motor 125 (Fig. 2). The drive pinion 126 is coupled to the armature shaft of the motor 125. It meshes with and drives the bevel gear 127. This gear 127 is secured by screws 128 to the sleeve 129 which is keyed to the shaft 130. There is a spur gear 132 secured to the shaft 130. This gear 132 meshes with a spur gear 133 which is secured to a shaft 134 (Fig. 7). The two shafts 130 and 134 are mounted in parallelism with one another in anti-friction bearings on the bracket 135 which is secured to the frame of the machine. The shaft 134 is mounted coaxially of the cradle 27. At its forward end, it is mounted on the anti-friction bearing 136 (Fig. 4) which is secured in the L-shaped bearing-member 137. Both arms of the bearing member 137 are tubular. This bearing member is rotatable in the cradle but is held against axial movement relative to the cradle by the cap-member 138 which is secured to the bearing member by screws 139.

There is a miter gear 140 keyed to the forward end of the shaft 134. This gear meshes with a miter gear 141 that is formed integral with the sleeve 142 which is journaled in the short arm of the L-shaped bearing member 137 on anti-friction bearings 143. The sleeve 142 carries a key 145 that engages in the splined-slot 146 in the shaft 147. The shaft 147 is adapted to slide in the sleeve 142 during adjustment of the slide 33 radially on the face of the cradle. The key 145 and splined-slot 146 permit of this sliding movement of the shaft 147 while, at the same time, providing a driving connection between the gear 141 and the shaft 147.

The shaft 147 is mounted at one end in the sleeve 142, as described. At its opposite end it is keyed to the bevel pinion 154. This pinion is journaled on anti-friction bearings 148 in a bracket 150 which is secured by the collar 151 and screws 152 to the depending portion 68 of the tool carrier 50.

The pinion 154 meshes with a bevel gear 155 that is journaled on anti-friction bearings 156 and 158 in the bracket 150. The gear 155 is of the long-shank type. There is another bevel gear 160 keyed to the shank or shaft of the gear 155. This gear 160 meshes with a bevel gear 161 that is keyed to the shaft 69. The shaft 69 is journaled at one end on the anti-friction bearing 163 in the depending portion 68 of the carrier 50. At its other end, the shaft 69 is journaled on anti-friction bearings 164 in the bearing portion 66 of the swivel head 65 and in a cap-member 167. The cap-member 167 is secured to the bearing portion 66 of the swivel head 65 by screws 168. 157 and 165 indicate oil seals.

There is a bevel pinion 170 keyed to the shaft 69. This pinion 170 meshes with and drives a bevel gear 171. The latter gear is secured by screws 172 to a sleeve 173 that is mounted on the cutter spindle 92 and has a splined connection therewith through the pin or key 174, which engages in the slot 175 cut longitudinally in the cutter spindle. The sleeve 173 is held against movement relative to the swivel-head 65 by the cap-member 176 and washers 177 and 178. The cap-member 176 is secured to the sleeve 173 by the screws 179.

In the axial adjustment of the cutter spindle 92 to compensate for sharpening of the cutter, the spindle slides in the sleeve 173 and the support 94 slides on the swivel head 65, the key 174 maintaining the driving connection from the motor 125 to the spindle. In the angular adjustment of the swivel-head 65, the swivel-head is adjusted about the axis of the shaft 69 and of the pinion 170; the gear 171 rolls on the pinion 170 and the driving connection between the motor 125 and the cutter spindle is maintained. In the angular adjustment of the carrier 50, shaft 147 and bracket 137 are swung about the axis of the shaft 134 and gear 140, the gear 141 rolling on the gear 140 and maintaining the driving connection to the cutter spindle. In the radial adjustment of the slide or carriage 33, as already described, the shaft 147 slides in the sleeve 142 and the drive is maintained through the key 145 and splined-slot 146.

185 designates the sliding base of the machine. This base slides on ways 186 formed on the upper surface of the frame 20 (Fig. 2). Its movement is in the direction of the axis of the cradle 27 like the movement of the sliding base in the machine of U. S. Patent No. 1,656,633 of January 17, 1928, issued to E. C. Head et al. In general, the sliding base and the work head mounted thereon are similar in construction to the corresponding parts of the machine of this patent. Reference may be had to this patent for further details of the structure of the sliding base. As pointed out in this patent, use of a sliding base makes it possible to operate a machine faster for the work can clear the cutter sooner than with a swinging base, enabling the indexing operation to be completed sooner and the sliding base can be operated at higher speeds than a swinging base without vibration or jar. These advantages are retained in the present machine and in addition there is obtained the marked advantage in reduction of cutter spindle adjustment to which extended reference has already been made above.

Mounted on the sliding base for angular adjustment thereon is a carrier 188. Its angular adjustment is for the purpose of adjusting the blank into the cutting plane of the cutter and depends upon the pitch cone angle of the gear to be cut. The carrier 188 is secured in any position of its angular adjustment on the sliding base 185 by T-bolts 189, the heads of which engage in the arcuate T-slots 190 which are formed in the upper face of the sliding base 185.

There is a column 192 slidably mounted on the carrier 188 for adjustment in a direction axial to the work spindle of the machine. This adjustment is for the purpose of positioning the blank at the correct cone distance from the axis of the cradle and depends upon the cone distance of the gear to be cut. The column can be secured in any adjusted position by T-bolts 193, the heads of which engage in the T-slot 194 formed in the upper surface of the carrier 188.

The work head 195 is adjustable vertically on the column 192 for the purpose of enabling hypoids as well as spiral bevel gears to be cut on this machine. This vertical adjustment of the work head is effected by rotation of a screw shaft 197 (Figs. 1 and 2) which threads into the column 192. The work head slides for the purpose of this adjustment on ways 198 and 199 formed on the column 192. It is secured in position after adjustment by the strap or gib 200 and the clamping bolts 201.

The work spindle 205 is journaled in the work head. The gear blank G (Fig. 1) to be cut may be secured to the work spindle by any suitable means. In Figure 2, for the sake of clearness in illustration, the blank and chucking mechanism are omitted from the drawings.

In the operation of the machine, the cutter rotates continuously on its axis. In cutting each tooth space, the sliding base is fed toward the cutter to feed the blank into proper depth and the cradle and blank are rotated in timed relation to produce the generating roll. If the machine is arranged to cut on roll in one direction only, the direction of the cradle and blank rotation will be reversed to return the cutter and cradle to initial position when the tooth profile or profiles have been completely generated, and the blank will be withdrawn from engagement with the cutter by reverse movement of the sliding base, and when the blank is clear, it will be indexed. If the machine is a double-roll machine, that is, a machine which cuts during roll in both directions, then, after the directions of the cradle and blank rotations have been reversed, the blank will be fed further into the cutter so that, during the roll in the opposite direction, a final finishing cut may be taken. At a predetermined point in the roll, the blank will be withdrawn from engagement with the cutter by movement of the sliding base and the blank will be indexed.

In the present machine, the movement of the sliding base is controlled by a cam 210 (Figs. 1 and 2) which rotates continuously in one direction. This cam may be of the double-track type as illustrated. The connections between this cam and the sliding base have not been shown but they may be the same as employed in the Head et al. patent above mentioned or of any suitable type.

The drive to this cam will now be described. Mounted on the shaft 130 (Fig. 2) is a spur gear 212 which meshes with and drives a spur gear 213 (Figs. 2 and 7). This spur gear 213 is secured to a shaft 214 that is journaled on anti-friction bearings 215 and 216 in the bracket 135. There is a bevel gear 217 keyed to the inner end of the shaft 214. This bevel gear meshes with two oppositely disposed bevel gears 218 and 219.

The bevel gear 218 is of the long-shank type and its shank 222 is mounted on anti-friction bearings 223 and 224 in the bracket 135. The bevel gear 219 is formed integral with a hollow sleeve 226 which surrounds the shaft 220 and is mounted in the bracket 135 on spaced bearings 227 and 228. The shaft 220 is journaled at one end in a counterbore of the gear 218, being mounted on the anti-friction bearings 229. At its other end, the shaft 220 is mounted in the bracket 135 on an anti-friction bearing 230.

The motor 125 (Figs. 1 and 2) is reversible so as to operate cutters of opposite hands. It is desirable, however, to rotate the feed cam always in one direction regardless of the direction of rotation of the cutter. This is the reason of the provision of the two gears 218 and 219.

There are clutch teeth 232 and 233 formed on the opposed end faces of the gears 218 and 219. These clutch teeth are adapted to cooperate, respectively, with clutch teeth 236 and 237 formed on the two ends, respectively, of a clutch member 235. The clutch member 235 is keyed to the shaft 220 and is adapted to be shifted to engage with either gear 218 or gear 219 by oscillation of a yoke-member 238 which may be of standard construction and which engages in the peripheral slot 239 formed in the clutch member 235. A suitable lever (not shown) may be provided for manipulating the yoke-member 238. When the shaft 214 is rotating in one direction, the clutch member is engaged with gear 218 to transmit rotation in the desired direction to the shaft 220. When the shaft 214 is rotating in the opposite direction, the clutch member must be engaged with the other gear 219 to transmit rotation in the desired direction to the shaft 220. The cooperating clutch teeth on the two gears and the clutch member are so formed, as clearly shown in Fig. 4, that the clutch can only be engaged with a gear 218 or 219 when the gear is rotating in the direction required to transmit rotation in the desired direction to shaft 220. If the clutch is not engaged with the correct gear 218 or 219, as the case may be, it is thrown out of engagement. Thus the clutch teeth constitute a safety device preventing driving of the feed cam in the wrong direction.

There is a bevel gear 240 keyed to the lower end of the shaft 220. This gear meshes with a bevel gear 241 (Fig. 8) on a horizontal shaft 242. There is a miter gear 244 secured to one end of the shaft 242. This gear 244 meshes with and drives a miter gear 245. The gear 245 is keyed to the hub of a spur gear 246 that may be clutched to the shaft 247 by a clutch 243 which is keyed to the shaft 247. This clutch is provided with clutch teeth on its inner end face that are adapted to engage clutch teeth formed on the opposed end face of the gear 245. The nut 249 which threads on the shaft 247 serves to hold the clutch in engaged position.

The spur gear 246 meshes with and drives the spur gear 248 which is keyed to the shaft 250. The shaft 250 is mounted in the base or frame of the machine and extends nearly the whole length of the base of the machine as shown in Figure 2. The miter gear 251 is secured to this shaft. It meshes with and drives the miter gear 252 which is secured to the worm shaft 253 (Figs. 1 and 2). There is a worm 254 secured to the worm shaft 253. This meshes with the worm wheel 255 which is keyed to the shaft of the cam 210.

Through the gearing described, then, the cam 210 is driven continuously in one direction to impart the alternate movement of feed and withdrawal to the sliding base 185.

Figure 8:
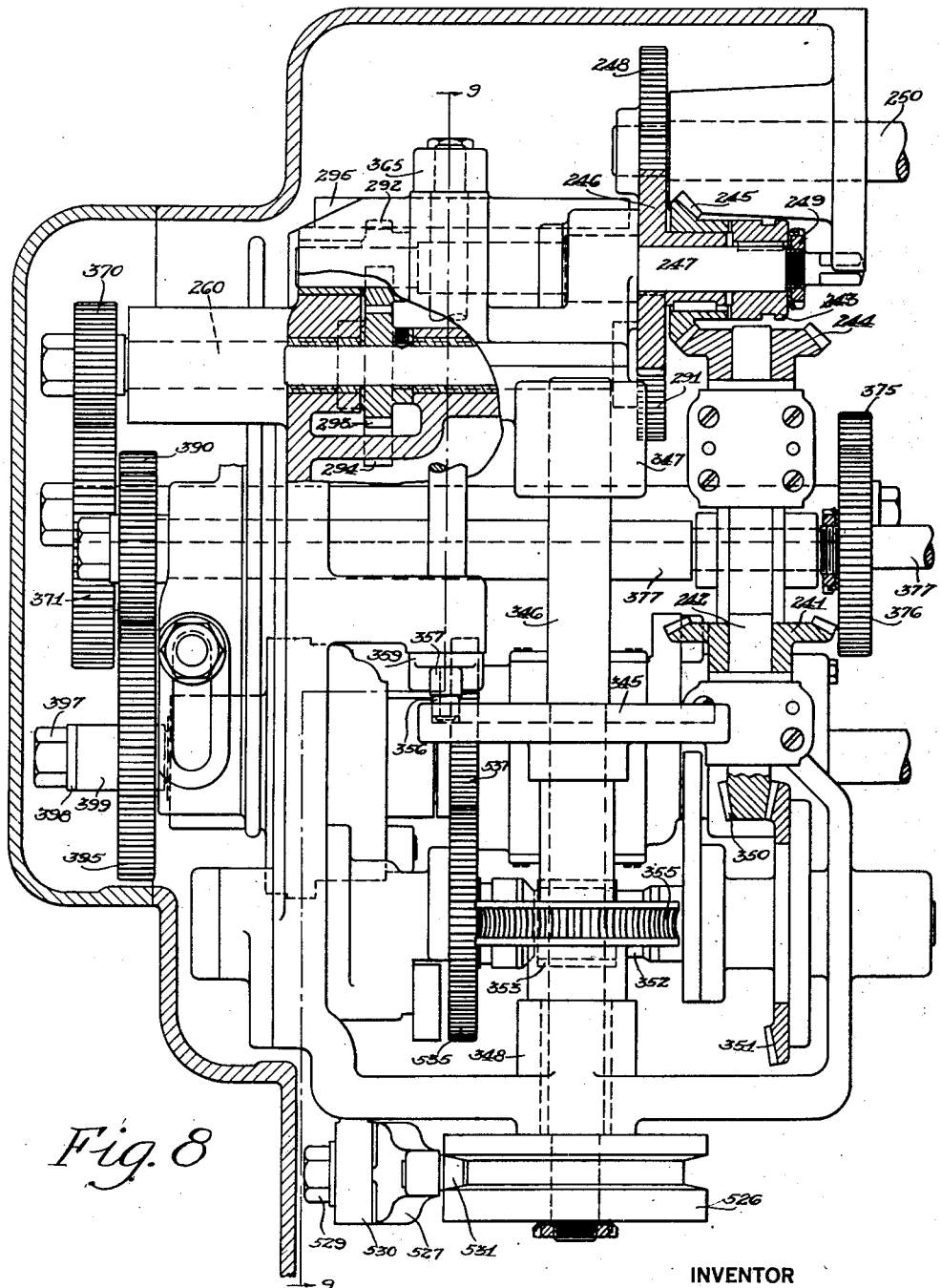
Figure 8 is a horizontal sectional view taken through the frame or base of the machine, at one end thereof, and showing details of the reversing and index mechanisms and of the controls therefor.
Figure 9:
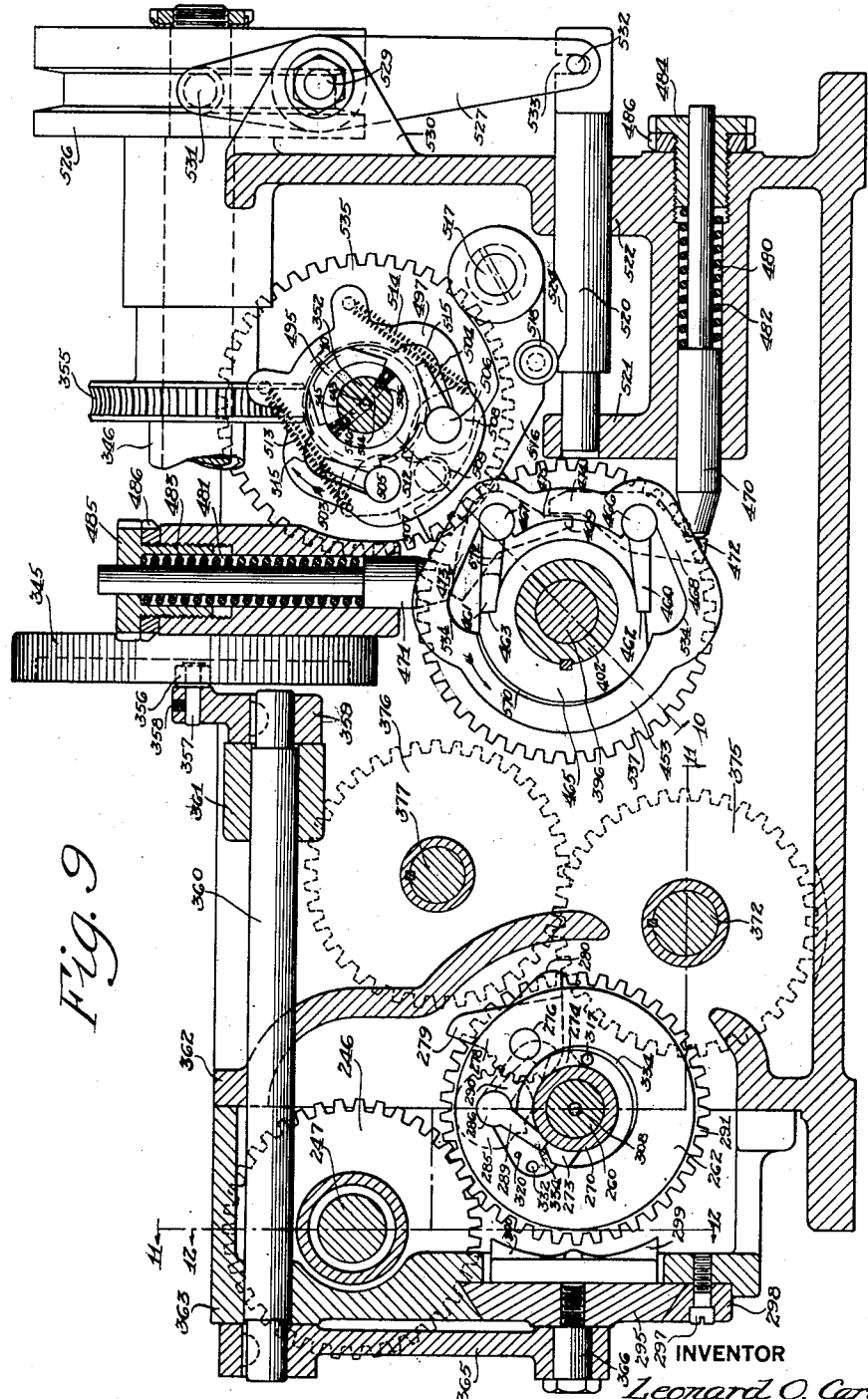
Figure 9 is a section on the line 9—9 of Figure 8, the view being taken in the direction of the arrows.
Figure 11:
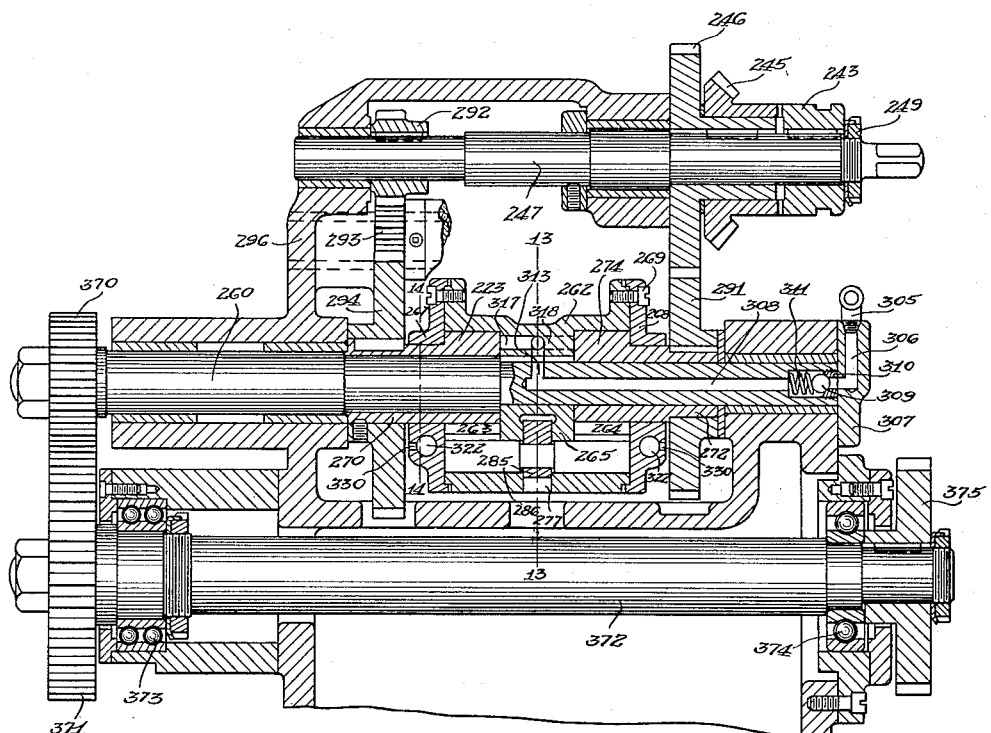
Figure 11 is a section on the line 11—11 of Figure 9 looking in the direction of the arrows.

The shaft 247 constitutes the drive shaft to the automatic reversing mechanism of the machine. The driven shaft is designated at 260 (Figs. 8, 9 and 11). Keyed to the shaft 260 is a drum-member 262, which is formed with chambers 263 and 264 at its two ends, that are separated by the central partition wall 265 of the drum and are closed by cover-plates 267 and 268, respectively. The end-plates 267 and 268 are secured in position by screws 269.

Journaled on the shaft 260 are two sleeves 270 and 272. The sleeve 270 extends through the end-plate 267 into the chamber 263 of the drum 262. It is formed within the chamber 263 with an integral lug or abutment 273. The sleeve 272 extends through an opening in the end-plate 268 into the chamber 264 of the drum 262. It, also, is provided with an integral lug or abutment. This is shown in dotted lines at 274 in Figure 9. It is of the same shape as the lug or arm 273 but is angularly spaced therefrom around the shaft 260.

Figure 13:
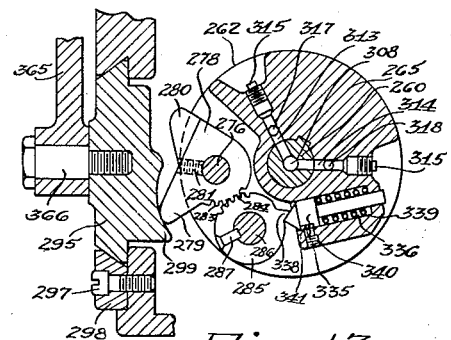
Figure 13 is a fragmentary sectional view, taken substantially on the line 13—13 of Figure 11.

Mounted on a pin 276 within a well 277 formed in the partition wall 265 of the drum is a rocker-member 278 (Figs. 9 and 13). This member is formed with two axially spaced wings 279 and 280. It is secured to the pin 276 by the set screw 281 so that the rocker-member and pin rock together relative to the drum. The member 278 is, also formed on a portion of its periphery with gear teeth 283. These teeth mesh with segmental teeth 284 formed on a portion of the periphery of a disc 285 that is pinned to a shaft 286 which is journaled in the drum 262.

There are two arms or dogs 289 and 290 formed integral with the shaft 286 (Fig. 9). These are oppositely directed, as clearly shown in Figure 9 and extend from opposite ends of the shaft 286, respectively, into the chambers 263 and 264, respectively, of the drum 262.

The sleeves 270 and 272 are driven simultaneously in opposite directions from the shaft 247. The sleeve 272 is driven in one direction from the shaft 247 by the gear 246 which meshes with a spur gear 291 that is keyed to the sleeve 272. The sleeve 270 is driven in the opposite direction by the gears 292, 293 and 294. The gear 292 is keyed to the shaft 247. The gear 293 is an idler gear and is secured to a stub-shaft 296 that is suitably journaled in the frame. The gear 294 is keyed to the sleeve 270.

The dogs 289 and 290 are adapted to be engaged alternately with the lugs 273 and 274, respectively, to cause the drum 262 and the shaft 260 to which the drum is keyed, to be driven alternately in opposite directions. The construction is such that when one of the dogs 289 or 290 is engaged with the associated lug 273 or 274, as the case may be, the other dog is out of engagement with its associated lug.

Figure 12:
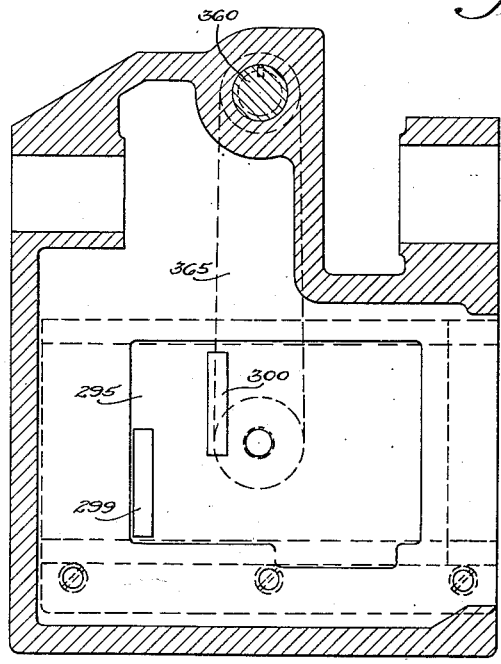
Figure 12 is a section substantially on the line 12—12 of Figure 9.

The movement of the dogs 289 and 290 alternately into and out of engagement with their respective lugs 273 and 274 is effected automatically by reciprocation of a slide 295 (Figs. 9, 12 and 13). This slide reciprocates in a dove-tailed guideway, part of which is formed in the frame of the machine and part of which is formed by the retaining gib or strap 298. This strap is held in position by screws 297 that thread into the frame. There are two longitudinally spaced cam-like projections 299 and 300 formed on the inside face of the slide 295. One of these projections 299 extends from the bottom of the slide upwardly just beyond the center of the slide while the other projection 300 extends from the top of the slide downwardly just beyond the center of the slide. The projections are reversely curved, their shapes being clearly shown in Figures 10 and 13.

The slide 295 is shifted longitudinally in opposite directions to bring the cam projections 299 and 300 alternately into register with the paths of movement of the wings 279 and 280, respectively, of the rocker-member 278.

When the machine is started up, the rotation of the sleeves 270 and 272 in opposite directions will bring one or other of the lugs 273 or 274 into driving engagement with its associated dog 289 or 290, as the case may be, for the movement of the rocker-shaft 286 is such that one of these dogs is always in engaging position at the same time that the other is out of engaging position. Let us assume that the lug 274 and dog 290 are in driving engagement at the beginning of the operation. After the shaft 260 has been rotated the desired number of turns in the same direction, as the direction of rotation of the gear 291, the cam slide 295 is shifted to the left from the position shown in Figure 12 to bring the cam projection 299 into registry with the path of movement of the wing 279 of the rocker-member 278. The continued rotation of the drum 262 causes the tip of the wing 279 to be moved over the surface of the cam projection 299. This causes the rocker-member 278 to be rocked on its axis, rocking the disc 285 through its geared connection 283-284 therewith. This causes the dog 290 to be rocked out of engagement with the lug 274 and the dog 289 to be rocked down into position where it will engage the lug 273. When the dog 289 engages the lug 273, the shaft 260 will be reversed and will be driven by the sleeve 270. After the desired number of rotations of the shaft 260 in the direction in which it is driven by the sleeve 270, the slide 295 will be shifted back to bring the cam projection 300 into registry with the path of the wing 280. The tip of the wing 280 will then be carried across the surface of the cam projection 300, causing the member 278 to be rocked about its axis, rocking the disc 285 on its axis, disengaging the dog 289 from the lug 273 and bringing the dog 290 into position to engage the lug 274. Thus again the shaft 260 will be reversed and will again drive in the direction of rotation of the sleeve 272.

To cushion the shocks of reversal of the shaft 260 and to make the reversing mechanism quiet in operation, means has been provided for hydraulically dampening the engagement of the dogs 289 and 290 with their respective associated lugs 273 and 274. For this purpose, the chambers 263 and 264 of the drum are kept filled with oil or another suitable liquid and a construction is provided such that the dogs can only engage their respective lugs after a controlled displacement of the body of liquid entrapped between each lug and its associated dog after the dog has been moved down into engaging position as above described. The means whereby the hydraulic cushioning effect is obtained will now be described.

Oil or a suitable liquid is continuously supplied to the chambers 263 and 264 from a pump (not shown) which may be mounted in any suitable manner in the base of the machine and which operates to pump oil from a sump of suitable capacity provided in the base of the machine. Oil is conducted from the pump by the pipe 305 (Fig. 11) into a duct 306 in a cap-member 307 that is secured to the frame and covers the inner end of the shaft 260. There is a longitudinal duct 308 drilled in the shaft 260. The shaft 260 is also counterbored to receive the ball-check valve 309. The valve-seat 310 is threaded into the end of the shaft 360. The valve 309 is normally urged into closed position by the coil spring 311 to shut off communication between the duct 306 and the duct 308, but the spring 311 is so chosen that the pressure of oil flowing from the pump will open the valve 309 enough to allow leakage from the drum to be replaced. There are two ducts 313 and 314 drilled radially into the shaft 260 (Fig. 13). These two ducts extend also through the partition wall 265 of the drum and have their outer ends closed by plugs 315. A duct 317 leads from the duct 313 into the chamber 263 of the drum, while a duct 318 leads from the duct 314 into the chamber 264 of the drum. As indicated, the ducts 317 and 318 are spaced angularly around the drum in substantial conformity with the angular spacing of the dogs 289 and 290.

To prevent entrapment of air in the drum chambers, which might interfere with proper functioning of the cushioning mechanism, slight leakages of oil from the two drum chambers 263 and 264 are allowed to take place during the time that the dogs which are mounted in these respective chambers are not in driving position. To this end, a small leak duct is provided leading from each drum chamber. Only one of these ducts is shown in the drawings for the sake of clearness in illustration. This duct is indicated at 320 in Figures 9 and 14. It leads from the chamber 263. A corresponding duct angularly spaced from the duct 320 in conformity with the spacing of the dogs 289 and 290 leads from the other chamber 264. These leak-ducts lead into valve-chambers 322 (Figs. 11 and 14) formed in the two end caps 267 and 268 of the two chambers 263 and 264. As the valve chamber 322 and the valves which are mounted therein are alike in construction and operation, only one has been shown and will be described.

There is a valve 324 mounted in each of the chambers 322. Each of these valves is provided with spaced collar or guide portions 325 and 326 (Fig. 14) which serve to guide the valve in its movement in the chamber 322 and which enables the valve to perform its function. Each valve is normally pressed by a coil spring 328 into the position shown in Figure 14 to allow oil to flow from the corresponding leak-duct 320 into the valve-chamber. The coil spring surrounds a reduced portion of the valve stem and is interposed between the collar portion 325 and the screw 329 that threads into the chamber 326 and closes the end of that chamber. There is a leak-duct 330 leading from each chamber 322 (Fig. 11). These ducts lead to the outside of the cap-members 267 and 268, respectively, allowing oil to leak from the chambers 322 when the valves 324 are in the position shown in Figure 14.

Besides the leak-duct 320, there is also a duct 332 leading from each of the chambers 263 and 264, respectively, into each of the valve-chambers 322. These ducts 332 (Figs. 9 and 14) lead into the bottoms of the associated valve-chambers 322.

The two drum chambers 263 and 264 are shaped as clearly shown in Figure 9. They are substantially cylindrical for the greater portion of their angular extent but each is provided at one side with a pocket or recess in which the associated dog 289 or 290 can move when swung out of driving position. These pockets or recesses are oppositely disposed and angularly spaced in conformity with the angular spacing and opposite disposition of the dogs 289 and 290, as clearly shown in Figure 9. When either dog is swung to disengaged position, oil entrapped in the associated pocket or recess can escape through the associated leak duct 320. Each of the dogs has a slot 334 in its tip and the oil entrapped when the dog is swung to disengaged position can also escape through this slot from one side of the drum chamber to the other.

Each of the lugs 273 and 274 is of a width and height to have fluid-tight contact with the side-walls of the chamber in which it rotates and with the cylindrical portion of the inner wall of said chamber. Each of the driving dogs 289 and 290 is, also, of a width to have substantially fluid-tight contact with the side walls of the chamber in which it operates. When either of the driving dogs 289 or 290 is moved, then, into operative position, oil will be entrapped between the dog and its associated lug 273 or 274.

There is a groove 334 (Fig. 10) cut into the inner wall of each of the drum chambers 263 and 264. These grooves are of crescent shape, that is, their bottoms are eccentric of the axis of the shaft 260, and they extend over halfway around the outer walls of the respective drum chamber.

The operation of the cam slide 295 is such as to trip the dogs 289 and 290, respectively, into driving position ordinarily just before the associated lug 273 or 274 has reached a position to shut off the ducts 317 or 218 leading into the chamber in which the lug rotates. The shapes of the cam projections 299 and 300 are such that not only are the dogs 289 and 290 reversed without clash or noise but the shutting off of the ducts 317 and 318 is gradual, thereby adding to the cushioning effect of the whole hydraulic dampener.

As soon as one of the dogs 289 or 290 has dropped into driving position, oil is entrapped between the dog and its associated lug. As the lug continues to rotate, part of the oil can escape from between the lug 273 or 274 and its associated driving dog through the eccentric groove 334 in the corresponding drum chamber. The amount of oil which can thus escape is gradually diminished, however, because in its rotation, the lug 273 or 274, as the case may be, gradually closes off the eccentric groove 334. Thus before the lug 273 or 274, as the case may be, comes into driving engagement with its associated dog, escape of oil between the two is shut off entirely. At this time, however, oil entrapped between a lug and its associated dog may escape through duct 332 into the valve chamber 322, forcing the valve 324 outwardly in its chamber against the resistance of the spring 328. This shuts off the leak-duct 320.

The gradual, controlled entrapment of the oil between a lug and its associated dog during the time the lug is closing off the eccentric groove 334 produces a relative braking effect between the drum 262 and shaft 260, which at the time are rotating in one direction, and the associated lug which is rotating in the opposite direction. The controlled escape of the oil from the chambers 263 or 264, as the case may be, into the associated valve chamber 322, after the groove 334 has been shut off, also operates to gradually slow up the drum and the lug relative to one another prior to driving engagement. This slowing-up action is all the more effective because at the time one of the dogs is moved into driving position, the other dog is moved out of driving position. Thus just prior to reversal, the drum 262 and shaft 260 are simply rotating under their own momentum. The result of the gradual braking action of the resistance of the oil entrapped between one of the dogs and its corresponding lug is that by the time the dog and lug move into engagement, the speed of the shaft 260 which carries the drum and of the sleeve which carries the lug will have been reduced so that the lug picks up the drum and shaft without shock or jar. The operation of the reversing mechanism of the invention is, therefore, quiet and vibrationless.

It is desirable, of course, that the movement of the dogs 273 and 274 into and out of driving position be substantially instantaneous. To this end, a load and fire mechanism is provided to assist the cams 299 or 300, as the case may be, in quickly reversing the positions of the driving dogs. This load and fire mechanism includes a plunger 335 (Fig. 13) that slides in a chamber 336 formed in the partition wall 265 of the drum. This plunger is provided with a V-shaped outer end which is adapted to engage a V-shaped projection 338 formed on the disc 285. The plunger is urged outwardly of its chamber 336 by a coil-spring 339. Its outward movement is limited, however, by a set-screw 340 which threads into the outer wall of the chamber 336 and engages in a recess 341 cut into the head of the plunger 335. As soon as the projection 338 has moved over the center of the plunger 335 in the movement of the disc 285 in either direction, the plunger comes into action and quickly forces the disc on to the end of its movement, to bring one of the dogs into engagement with the periphery of the sleeve next to drive.

The slide 295 (Figs. 9, 12 and 13) is reversed automatically to operate the reversing mechanism by action of a cam 345 (Figs. 8 and 9). This cam is mounted upon a cam-shaft 346 which is journaled in bearings 347 and 348 in the base of the machine. The cam 345 is driven continuously in one direction during the operation of the machine, being driven from the shaft 242 (Fig. 8) through the bevel gearing 350 and 351, the sleeve 354 to which the gear 351 is secured (Fig. 10), the worm-shaft 352 to which the sleeve 354 is secured, the worm 353 secured to the shaft 352, and the worm wheel 355 (Figs. 8 and 9), the latter gear being secured to the shaft 346 on which the cam 345 is mounted.

The cam 345 is of the face-type. There is a roller 356 (Figs. 8 and 9) that engages in the track of this cam. This roller is mounted on a stud 357 which is secured by the set-screw 358 to the arm 359. This arm 359 is keyed to a rock-shaft 360 journaled in bearings 361, 362 and 363 in the frame of the machine. A lever-arm 365 is keyed to the outer end of the shaft 360. This arm is connected by means of the stud 366 with the slide 295.

As the cam 345 rotates, the rock-shaft 360 is oscillated first in one direction and then in the other to shift the slide 295 back and forth to cause operation of the reverse mechanism as above described.

From the preceding description, it will be seen that the shaft 260 is driven first in one direction and then in the other. This shaft imparts the generating roll to the cradle and to the work spindle. The drive to the cradle will now be described.

There is a spur gear 370 secured to the outer end of the reverse shaft 260 (Figs. 8 and 11). This gear meshes with a spur gear 371 that is secured to a shaft 372 which is mounted in the frame in parallelism with the shaft 260 and is journaled on anti-friction bearings 373 and 374. The gears 370 and 371 constitute the roll-change gears of the machine. There is a gear 375 keyed to the inner end of the shaft 372. This gear meshes with a gear 376 that is secured to a shaft 377 (Fig. 8). The shaft 377 is suitably journaled in the base of the machine in parallelism with the shaft 372.

The shaft 377 extends beneath the cradle of the machine. There is a bevel gear 378 secured to this shaft at its inner end (Fig. 3). This gear meshes with another bevel gear 379 that is keyed to a worm shaft 380. The worm shaft is suitably journaled in a bracket 381 mounted in any suitable manner in the base of the machine. There is a worm 382 formed integral with the shaft 380. This worm meshes with a worm wheel 384 (Figs. 3 and 4) that is secured to the cradle 27. The worm wheel 384 is of the split-type and the two parts are secured together by bolts 385. The screws 386 serve to secure this worm wheel to the cradle. Through the drive just described, it will be seen that the cradle is rotated alternately in opposite directions.

To adjust the cutter into correct operative position, aside from the adjustments already described specifically, it may be necessary to adjust the cradle on its axis. To do this, the operator removes the roll gear 371 and applies a wrench to the end of the shaft 372. The cradle is, of course, adjustable through an angle of 360°. In order to enable this adjustment to be made accurately, the gib 28 is graduated as shown in Figure 3 and an index finger 387 is secured to the face of the cradle to read against the graduations.

The generating drive to the blank, that is, the gearing which rotates the work spindle during cutting will now be described. There is a spur gear 390 (Figs. 8 and 10) secured to the shaft 377. This meshes with a spur gear 394 (Fig. 10) secured to a stub-shaft 393. This spur gear 394 meshes with a spur gear 395 that is keyed to the shaft 396. The gear 395 is held against the shoulder on the shaft 396 by the nut 397, washer 398 and spacer sleeve 399. The shaft 396 is journaled in the bushing 400 and anti-friction bearing 401 in a sleeve 402 that is formed integral with a differential housing 404. The bearing 401 is held in position by a cap-member 405 which is secured within the differential housing by screws 406.

One of the side-gears 408 of the bevel gear differential housed in the housing 404 is keyed to the shaft 396. This side-gear 408 meshes with the planetary gear 409 of the differential. The gear 409 is formed integral with a stub-shaft 410 that is journaled at opposite ends in the differential housing, being mounted on anti-friction bearings 411 and 412. The cover-plates 413 and 414 are detachably secured to the differential housing by screws 415. These permit ready assembly of the gear 409 and bearings 411 and 412.

The gear 409 meshes with the side-gear 416 of the differential. The side-gear is keyed to a telescoping shaft 417 that is journaled at one end in the sleeve 418 formed integral with the differential housing, the shaft 417 being mounted in the anti-friction bearing 419 which is secured in the sleeve 418 by the cap-member 420. This cap-member is held in position by screws 421. The shaft 417 is suitably journaled at its other end in the base of the machine.

There is a bevel gear 425 suitably secured to the shaft 417 at this latter end (Fig. 1). This gear 425 meshes with and drives a bevel gear 426 that is secured to a vertical shaft 427 which is so journaled in the work head carrier 188 that its axis coincides with the axis of angular adjustment of the work-head carrier. The telescoping shaft 417 allows of the sliding adjustment of the work head base required to bring the work into operative relation with the cutter as described above.

There is a bevel gear 428 secured to the upper end of the shaft 427 (Figs. 1 and 2). This gear meshes with and drives a bevel gear 430 that is keyed to a diagonal shaft 431. The diagonal shaft is suitably journaled in the work-head carrier 188. There is a bevel gear 432 keyed to this diagonal shaft. It meshes with a bevel gear 433 which is secured to one part of a telescoping shaft 434. The other end of this telescoping shaft has a bevel gear 435 fastened to it. This bevel gear meshes with a bevel gear 436 on a vertical telescoping shaft 437. There is a spur gear 438 secured to the upper end of the shaft 437. This spur gear forms one of a set of index change gears of which the other members are designated at 439, 440 and 441, respectively. The change gear 441 is secured to a vertical shaft 442 (Fig. 2).

There is a worm 443 secured to the shaft 442. This meshes with the index worm wheel 444 which is keyed to the work spindle 205 of the machine. The index worm wheel is of the split-type, the two parts being secured together by bolts 445.

The sleeve portion 402 of the differential housing 404 is rotatably mounted on bushings 450 and 452 (Fig. 10) secured in the body-portion 453 and cover-plate 454, respectively, of a fixed drum. The cover-plate 454 is secured to the body of the drum 453 by screws 455. The body-portion of the drum is integral with the frame of the machine.

During cutting, the differential housing is held against rotation. For this purpose, a pair of stop-dogs 460 and 461 (Fig. 9) are provided. These are adapted to engage, respectively, shoulders 462 and 463 formed on a stop-plate 465 that is rotatable in the drum 453 and is keyed to the sleeve 402 of the differential housing. Thus, during cutting, the differential gears will simply transmit motion between the shafts 396 and 417 and by suitably selected change gears, the blank will be rotated at a ratio relative to the rotation of the cradle to produce generated tooth profiles on the blank, of the desired shape.

The stop-dogs 460 and 461 are in the form of rocker-members having integral studs or shafts 466 and 467, respectively, that are journaled in the drum 453 and drum cover-plate 454. Each of the shafts 466 and 467 has a double-armed tail-piece keyed to it. These are designated at 468 and 469, respectively (Fig. 9).

The stop-dogs 460 and 461 are normally urged into and are held in locking engagement with the stop-plate 465 by spring-pressed plungers 470 and 471, respectively, which engage one arm 472 and 473, respectively, of each of the tail-pieces 468 and 469. The other arms 474 and 475, respectively, of each of the tail-pieces 468 and 469 overlap, as clearly shown in Figure 9. The plungers 470 and 471 are mounted in sockets 480 and 481, respectively, drilled in the frame of the machine. They are held in engagement with the arms 472 and 473, respectively, by coil-springs 482 and 483, respectively. These springs surround the stems of the plungers and are interposed between the heads of the plungers and nuts 484 and 485, respectively, that thread into the frame. Lock-nuts 486 are provided to hold the nuts 484 and 485 against rotation.

To index the work spindle, the differential housing is released and the housing rotated, through means which will now be described. This imparts to the work spindle an additional rotational movement of an algebraic nature which accelerates or decelerates the normal rotation of the work spindle, depending upon the direction of rotation of the differential housing during indexing, and thereby changes the ratio of blank to cradle rotation to effect the indexing.

Figure 10:
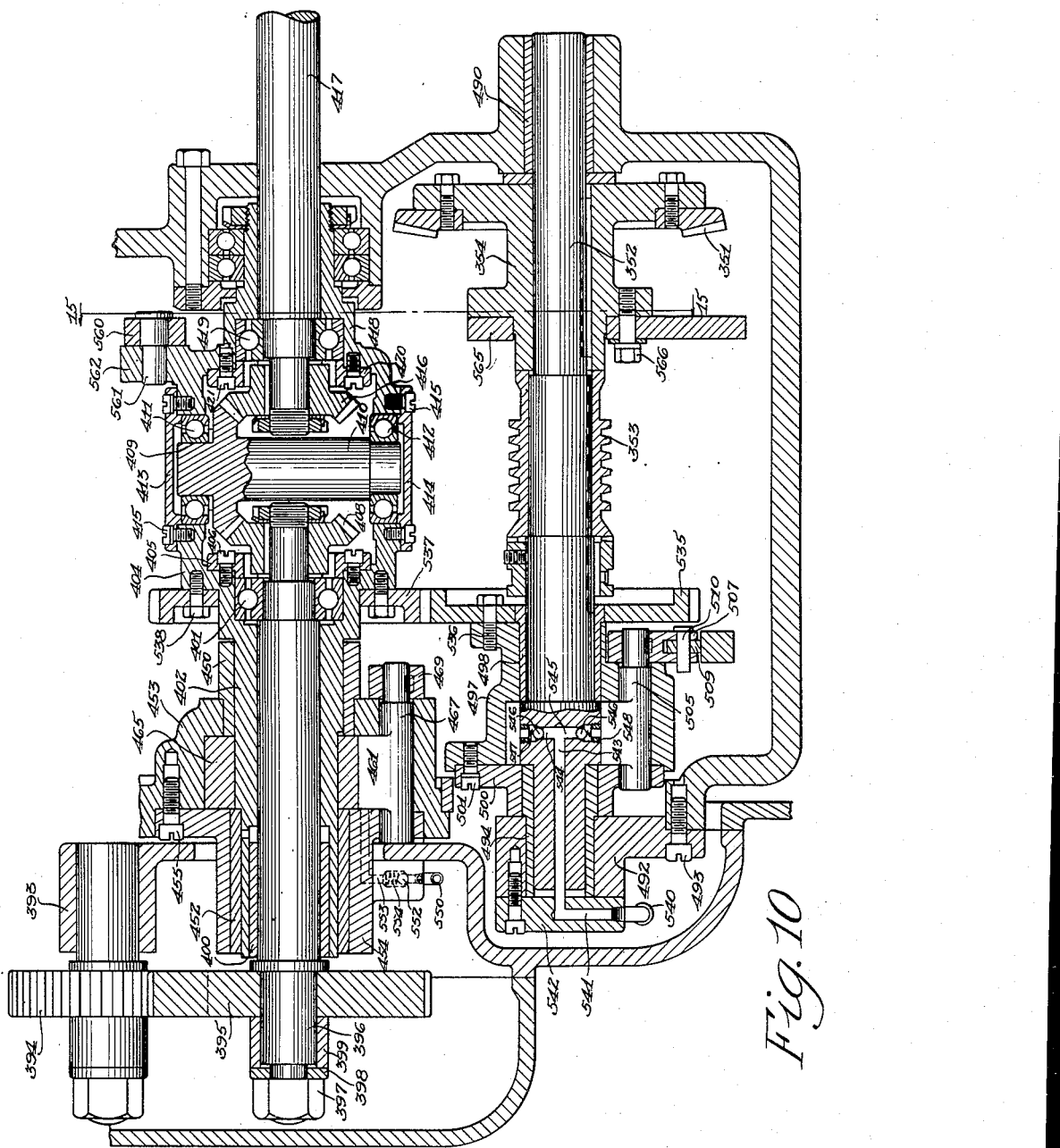
Figure 10 is a section on the line 10—10 of Figure 9, showing details of the indexing mechanism and drive to the work spindle.

The shaft 352, as already described, (Figs. 8, 9 and 10) is driven continuously in one direction during the operation of the machine. This shaft is journaled at one end in the frame of the machine being mounted on a bushing 490. At its opposite end it is journaled on a bushing 494 in a bracket 492 that is secured to the frame by screws 493. There is a projection or abutment 495, which is of considerable angular extent, formed on the shaft 352. This projection extends into a drum 497 that is journaled on the bushing 498 which is mounted on the shaft 352 (Fig. 10). The open end of this drum 497 is closed by a cover-member 500 which is mounted on the bushing 494 and which is secured to the drum proper by screws 501.

There are two pawls 503 and 504 (Fig. 9) mounted in the drum 497 that are adapted to engage the projection 495 to transmit the rotation of the shaft 352 to the drum. Each of these pawls 503 and 504 is secured to an integral rock-shaft designated at 505 and 506, respectively. The two rock-shafts are journaled in the drum 497 and the cover-plate 500. There is a tail-piece 507 keyed to the rock-shaft 505 and there is a tail-piece 508 keyed to the rock-shaft 506. The tail-piece 507 carries a roller 509 (Figs. 9 and 10) that is secured to the tail-piece by the pin 510. The tail-piece 508 has a toe-portion 512 which is adapted to engage the roller 509 of the other tail-piece. Coil springs 513 and 514, which are secured, respectively, at one end to the drum 497 and at their other ends to the two tail-pieces 507 and 508 at opposite sides of the respective rock-shafts 505 and 506 from the roller 509 and toe-portion 512, respectively, are provided to move the pawls 503 and 504 into engaging position relative to the projection 495. During cutting of the tooth surfaces of the blank, however, the two pawls 503 and 504 are held out of engagement with the projection 495 against the resistance of the springs 513 and 514. They lie in recesses 515 formed in the inside wall of the drum. They are so held by a trip-arm 516 which is pivotally mounted on a stud 517 that is secured in the frame of the machine. This lever carries a roller 518 that cooperates with a reciprocable cam-rod 520. The rod slides in suitable bearings 521 and 522 formed on the frame of the machine. The upper surface of the rod is formed with a cam slot 524, the shape of which is clearly seen in Figure 9.

When the rod 520 is in the position shown in Figure 9, the trip lever 516 is held in its upper position, engaging the roller 509 to hold the pawl 503 disengaged from the projection 495 against the resistance of the spring 513. In this position, the trip lever 516 also operates to hold the pawl 504 disengaged from the projection 495 for when the roller 509 is rocked upwardly, as shown, it engages the toe-portion 512 of the tail-piece 508, rocking the shaft 506 on its axis against the resistance of the spring 514 to move the pawl 504 to disengaged position. When the rod 520 is shifted to the left from the position shown in Figure 9, the roller 518 rides down in the cam slot 524 of the rod and the lever 516 drops away by gravity from the roller 509. This releases the pawls 503 and 504 and the two are immediately moved into engaging position under actuation of the springs 513 and 514.

The rod 520 is reciprocated by operation of a cam 526 (Figs. 8 and 9) that is secured to the shaft 346. The lever 527, which is pivotally mounted on the stud 529 that is secured in the lug 530 formed on the frame, carries a roller 531 at one end which engages in the trackway of the cam 526 and at its other end it carries the pin 532 which engages in a slot 533 formed in the rod 520.

As previously stated, the shaft 346 rotates continuously in one direction during the operation of the machine. Hence, as the cam 526 rotates on its axis, the rod 520 is moved alternately to the left and to the right to operate the pawls 503 and 504. The rod 520 also controls the stop-dogs 460 and 461 for when the rod is moved to the left to release the pawls 503 and 504, its end comes into contact with the tail-portion 474 of the arm 468, rocking this arm and the arm 475 from the positions shown in Figure 9 against the resistance of the spring plungers 470 and 471, thus disengaging the stop-dogs 460 and 461 from the stop-plate 465. This releases the differential housing 404. The inside wall of the drum 453 is formed with recesses 534 so that the stop-dogs 460 and 461 can be swung entirely clear of the stop-plate.

There is a spur gear 535 secured to the drum 497 by screws 536. This spur gear meshes with a spur gear 537 which is secured to the differential housing 404 by screws 538.

When the dogs 460 and 461 have been tripped out of engagement with the stop-plate 465 and the pawls 503 and 504 are in driving position, the motion of the shaft 352 is transmitted through the projection 495, one of the pawls 503 or 504, the drum 497 and the gears 535 and 537 to the differential housing 404. This causes the differential housing to be rotated on its axis and thus an additional rotational movement of an algebraic nature is imparted to the shaft 417 in the drive to the work spindle. The rotation of the shaft 417 is accelerated or decelerated depending upon the direction of rotation of the shaft 396 at the time of operative connection between the projection 495 and the differential housing 404.

To cushion the shock of connection of the continuously rotating shaft 352 with the differential housing, which, immediately prior to this connection, has been stationary, a hydraulic dampening mechanism has been provided. A combination hydraulic dampening mechanism and mechanical slow-stop drive has also been provided to eliminate jar when the stop-plate 465 is again locked up after each indexing operation. These several means for eliminating vibration and rendering the indexing mechanism quiet in operation will now be described.

The drum 497 is hollow and is adapted to contain oil or a similar fluid that acts as a medium for cushioning the engagement of the pawls 503 and 504 with the projection 496. The cushioning medium is pumped into the drum 497 from the pipe 540 (Fig. 10) through the duct 541 in the end-cap 542, the duct 543 that extends longitudinally of the shaft 352 and the ducts 544 and 545 that extend radially from the duct 543 into the chamber of the drum 497. Ball-check valves 546 are mounted in each of the ducts 544 and 545 to control the flow of oil from these ducts into the drum. These valves are normally urged into closed position by coil springs 547 that are interposed between the valves and the nuts 548 that thread into the ends of the ducts 544 and 545. The nuts 548 are drilled centrally to allow the oil or other dampening fluid to flow therethrough.

Oil is pumped into the chamber of the drum 453 from the pipe 550 (Fig. 10) through the chamber of the ball-check valve 552 and the right angular duct 553 that leads through the cap-member 454 into the drum chamber. The check-valve is normally closed by action of the coil spring 554.

The purpose of the ducts 541 and 553 is to supply oil to the drums 497 and 453 to replenish any oil that may leak from these drums in use, but the drums function as closed chambers.

There is a roller 560 (Figs. 10 and 15) secured to the differential housing 404 by means of a pin 561 that is mounted in a lug 562 formed integral with the housing. A cam 565 secured by screws 566 to the sleeve 354 cooperates with the roller 560 to return the differential housing fully to its locked-up position after each indexing operation, as will be described more particularly hereinafter. Figure 9 shows the positions of the parts during cutting. When a tooth surface of the blank or a pair of tooth surfaces, depending on whether the blank is being cut one side at a time or spread-blade, has or have been generated, the work is withdrawn from engagement with the cutter and the cam 526 functions to shift the cam-rod 520 to the left from the position shown in Figure 9. The left-hand end of the rod engages the tail-piece 474, rocking the stop-dog 460 out of engagement with the stop-plate 465. At the same time, the stop-dog 461 is also rocked out of engagement with the stop-plate, for the arm 474 of the tail-piece 468 is in engagement with arm 475 of the tail-piece 469. At this time, also, the roller 518 of the trip-arm 516 drops into the cam slot 524 and the pawls 503 and 504 are released, dropping into driving position under actuation of the springs 513 and 514.

If the machine is a single-roll machine, that is, if it is arranged to generate on roll of the cradle and work in one direction only, the directions of rotation of the stop-plate 465 and of the projection 495 will be as indicated by the arrows in Figure 16 of the drawings. The stop-plate tends to travel at twice the speed of rotation of the shaft 396 due to the differentiating action of the released differential housing. Thus the drum 497 will be driven from the differential housing through the gearing 537-535 in the same direction as the projection 495 but faster than the projection 495.

The pawls 503 and 504 are of a width to provide substantially fluid-tight contact with the end walls of the drum 497 and, likewise, the projection 495 is of a width to provide substantially fluid-tight contact with the end walls of the drum 497. The result is that oil is entrapped between the pawl 503 and the projection 495 when the pawl is dropped into driving position. This oil is gradually forced out of the way as the more rapidly rotating drum 497 overtakes the projection 495. The gradual exclusion of oil between the pawl 503 and the projection 495 eliminates any shock of driving engagement between the pawl and the projection. All of the oil may be excluded from between the pawls and projection or the pawl may actually have driving engagement through a non-excluded head of oil.

As soon as the pawl 503 and the projection 495 are in driving engagement, the motion of the continuously rotating shaft 352 is imparted to the differential housing through the gearing 535-537. Through the action of the differential, this motion is transmitted in turn to the shaft 417 (Fig. 10) causing the indexing motion to be imparted to the work spindle.

The index stop-plate is allowed to make a definite number of turns, preferably a fraction of a turn less than the full number required in order to index the blank. The cam 526 is so constructed and timed that then it causes the rod 520 to be shifted back to the position shown in Figure 9. This causes the stop-dogs 460 and 461 to be released and it causes the trip arm 516 to be raised to operative position again, as shown in Figure 16. The stop-dogs 460 and 461 drop onto the periphery of the stop-plate which at this time is in the position shown in Figure 16. The pawls 503 and 504 remain, however, in driving position, as shown in Figure 16 for the roller 509 will not yet have reached a position to engage the trip arm 516.

The stop-dogs 460 and 461 are of a width to form a substantially fluid-tight contact with the end walls of the drum 453. The stop-plate 465 is also of a width to form a substantially fluid-tight contact with the end walls of the drum 453. The result is that when the stop-dogs 460 and 461 are dropped into engaging position as shown in Figure 16, oil will be entrapped between the stop-dog 460 and the shoulder 462 of the stop-plate.

There is an eccentric groove 570 formed in the inside wall of the drum 453, the bottom of this groove being eccentric of the axis of the shaft 396. Some of the oil entrapped between the dog 460 and shoulder 462 can escape into the other side of the drum during the first part of the movement of the stop-plate, after the dog 460 has dropped into engaging position, but the groove 570 is gradually closed off. To allow free passage around the drum of the oil entrapped between the shoulder 462 and the dog 460, the dog 461 may have an orifice 572 therein through which oil may flow.

The oil cushion formed between the dog 460 and the shoulder 462 retards the rotation of the differential housing which has been holding the pawl 503 against the projection 495. The projection 495 then tends to rotate away from the driving pawl 503, but it continues to impress its motion upon the differential housing because of the head of oil still entrapped between the projection and the pawl 504. The projection continues to drive the differential housing until the roller 509 carried by the tail-piece 507 of the pawl 503 rides onto the cam surface of the trip-lever 516 which, as above described, is already in tripping position. When the roller 509 rides up on the cam surface of the lever 560, the pawls 503 and 504 are tripped out of engaging position against the resistance of the springs 513 and 514.

At this point, the cam 565, which is secured to the shaft 352 to rotate therewith, comes into contact with the roller 560 carried by the differential housing. The positions of the parts at this stage of the indexing operation is shown in Figure 17. When the pawls 503 and 504 are tripped out of engagement with the projection 495, the drum 497 ceases to drive the differential housing, but the shaft 352 is a continuously rotating shaft and hence, the cam 565 immediately commences to drive the differential housing.

At this time, free rotation of the differential housing is prevented by the braking action of the oil cushion between the shoulder 462 and the dog 460. The rotation of the differential housing is controlled directly by the cam 565. The oil entrapped between the shoulder 462 and the dog 460 is gradually excluded, being by-passed through the groove 570, and the cam 565 drives the differential housing on until the stop-plate is again locked up by engagement of the dogs 460 and 461 with the shoulders 462 and 463, respectively, of the stop-plate, the parts being returned, therefore, to the positions shown in Figure 9. The cam 565 is preferably so shaped as to bring the differential housing and stop-plate to a gradual stop while the gradual exclusion of oil from between the shoulder 462 and the dog 460 cooperates in effecting the lock-up without jar. The cam 565 is so shaped, of course, as to ride clear of the roller 560 at the moment of lock-up of the stop-plate.

In a double-roll generator, that is, a machine in which a rough generating cut is taken on the tooth profile during the roll of the cradle and work spindle in one direction and a finish generating cut is subsequently taken on the tooth profile on roll of the cradle and work spindle in the opposite direction, the direction of rotation of the shaft 396 at the time of release of the stop-plate 465 will be opposite to its direction of rotation in the single-roll machine. Hence, when the stop-plate is released on the double-roll machine, the drum 497 will be driven by the differentiating action of the differential in a direction opposite to the direction of rotation of the shaft 352. Thus the projection 495 will come immediately into engagement with the pawl 504 as soon as the entrapped oil is excluded from between the two. Otherwise, the operation of the parts during indexing will be substantially the same as that described for the single-roll machine.

While the invention has been described particularly in connection with a machine for producing spiral bevel and hypoid gears, it will be understood that the improved reversing and indexing mechanisms may be used on other types of gear cutting machines, also; in fact, on machine tools generally. In general, it may be said that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for producing gears, a frame, a work-spindle journaled in the frame, a full circular cradle rotatably mounted on the frame and adjustable thereon through an angle of 360°, a carriage adjustable radially on the cradle, a carrier adjustable angularly on the carriage about an axis parallel to the axis of the cradle, a swivel head adjustable angularly on the carrier about an axis perpendicular to the axis of the carrier, a tool support mounted on said carrier means for rotating the work-spindle and cradle on their respective axes, and a tool mounted on said tool support for movement in a longitudinally curved path across the face of a gear blank.

2. In a machine for producing gears, a frame, a full circular cradle rotatably mounted on the frame and angularly adjustable thereon through an angle of 360°, a carriage radially adjustable on the cradle, a carrier adjustable angularly on the carriage about an axis parallel to the axis of the cradle, a swivel head adjustable angularly on the carriage about an axis perpendicular to the axis of the carrier, a slide, and a cutter spindle journaled in the slide, said slide being adjustable on said head in a direction axial of said spindle a tool mounted on the tool support for movement in a longitudinally curved path across the face of a gear blank, means for rotating the work-spindle and cradle on their respective axes, and means for actuating the tool.

3. In a machine for producing gears, a continuously rotating member and a drum, said drum containing a liquid, an abutment member secured to one of said parts and extending into the chamber of said drum, a driving member mounted on the other of said parts and movable into the drum chamber to effect an operative connection with said abutment, said abutment and driving members being of such dimensions that when the driving member is moved into the drum chamber, liquid will be initially entrapped between the two, a work spindle, means connecting the drum to the work spindle to drive the latter on rotation of the drum, and means for periodically moving the driving member into operative position to thereby periodically effect indexing of the work spindle.

4. In a machine for producing gears, a work spindle, a train of gearing for rotating said spindle including a differential, a stationary drum containing a liquid, a stop-plate secured to the housing of said differential and extending into said drum, a dog mounted on the drum for movement into the chamber thereof to engage said stop-plate to lock the drum and differential housing against rotation, means for driving one member of the differential during cutting to transmit the generating motion to the work spindle, means for rotating the differential housing, when unlocked, to effect indexing of the work spindle, and means controlling the movement of said dog so that it is periodically tripped out of engagement with the stop-plate to allow rotation of the differential housing, said dog and stop-plate being of such dimensions that when the dog is moved into operative position, liquid will be entrapped between the two and said control means functioning so that said dog is returned into operative position when the stop-plate is angularly displaced from locked-up position whereby liquid is entrapped between the dog and stop-plate to cause cushioned stoppage of the stop-plate.

5. In a machine for producing gears, a work spindle, a train of gearing for rotating the work spindle including a differential, a stop-plate secured to the housing of said differential, means for driving one element of the differential continuously, a movable member for locking one element of said differential against rotation during cutting, means for rotating said differential element, when released, to index the work spindle, and means controlling the movement of said movable member so that periodically it is tripped out of engagement with the stop-plate and it is returned again into operative relation with the stop-plate after a predetermined movement of the differential element, and means for cushioning re-connection of the locking means with said differential element.

6. In a machine for producing gears, a work spindle, a train of gearing for rotating the work spindle including a differential, means for driving one element of the differential continuously, a movable member for locking another element of the differential against rotation during cutting, a continuously rotating member, means for connecting the latter member to the second differential element, when released, to effect indexing of the work spindle, means controlling the movement of the locking member and connecting means so that the locking member is periodically tripped out of locking position and the connecting means is simultaneously brought into operative position and so that the locking member is returned into operative position after a predetermined movement of the second differential element and the continuously rotating member is simultaneously disconnected from the second differential element, and means for cushioning the connection of the locking means with the differential element and for cushioning the connection of the continuously rotating member with the differential element.

7. In a machine for producing gears, a work spindle, a train of gearing for rotating said spindle including a differential, means for driving one element of the differential continuously, means for locking another element of the differential against rotation during cutting, a continuously rotating member, a drum and an abutment member, one of which is operatively connected to said second differential element and the other to the continuously rotating member, said drum containing a fluid and said abutment extending into the chamber of the drum, a pawl mounted on said drum, said drum having a recess therein in connection with the chamber of the drum in which said pawl may lie, when in inoperative position, and, said pawl being movable from said recess into said chamber to effect an operative connection with said abutment member and being adapted to entrap fluid between itself and the abutment member when so moved, and means for periodically releasing said second differential element and moving said pawl into engaging position.

8. In a machine for producing gears, a work spindle, a train of gearing for rotating said spindle including a differential, means for driving one element of the differential continuously, means for locking a second element of the differential against rotation during cutting, a continuously rotating member, means movable to connect the continuously rotating member to the differential, a member movable in opposite directions, said last named member being operative, when at one limit of its movement, to move the locking member to released position and to move the connecting means into operative position, and said movable member being operative, when at the opposite limit of its movement, to move the locking member to locking position and disconnect the connecting means, means controlling the movement of the last-named member whereby it is moved to the latter of the two described positions before the second differential element has been rotated completely back to locked position, and means connected to the continuously rotating member for rotating the second differential element the remainder of the distance to locking position at a gradually reduced velocity.

9. In a machine for producing gears, a work spindle, a train of gearing for rotating said spindle and having a differential incorporated therein, means for driving one element of the differential continuously, a hollow drum and an abutment member, one of which is operatively connected to a second element of the differential and the other of which is stationary, said drum containing a fluid and said abutment member extending into the chamber of said drum, a dog mounted in the chamber of said drum, said drum-chamber having a recess therein in which said dog may lie, and said dog being movable from said recess into engagement with said abutment member to hold the second differential element against rotation, a continuously rotating shaft, a second drum and a second abutment member, one of which is operatively connected to the continuously rotating member and the other to the movable member of the first drum and abutment set, said second drum containing a fluid, and said second abutment extending into the chamber of said second drum, a pawl mounted in the chamber of the second drum, said second drum-chamber having a recess therein in which said pawl may lie, and said pawl being movable from said recess into operative engagement with said second abutment, and means for periodically moving the dog from operative position and simultaneously moving said pawl into operative position.

10. In a machine for producing gears, a frame, a cradle rotatably mounted on the frame, a tool support mounted on the cradle and adjustable angularly thereon, a spindle rotatably mounted on the tool support and adapted to carry a face mill gear cutter, means for adjusting said spindle axially on said tool support, a work support slidably adjustable on said frame in a direction axial of the axis of said cradle, a work-spindle journaled in the work support, means for rotating the cradle and work-spindle on their respective axes and means for rotating the tool spindle.

11. In a machine for producing gears, a tool support, a work support, a cutter spindle rotatably mounted on said tool support and adapted to carry a face mill gear cutter, a drive shaft, means connecting the drive shaft to the cutter spindle to rotate said spindle on rotation of said drive shaft, means for rotating the drive shaft in opposite directions, means for imparting an alternate relative movement of feed and withdrawal between said supports comprising a rotary cam, and means for rotating said cam from the drive shaft in a single direction regardless of the direction of rotation of said drive shaft, said means comprising a bevel gear connected to the drive shaft, a pair of oppositely disposed bevel gears meshing with the first bevel gear and having clutch teeth on their opposed faces, and a slidable clutch member operatively connected to said cam and having clutch teeth on its end faces adapted to be engaged, respectively, with the clutch teeth of said bevel gears, the clutch teeth of said bevel gears and clutch member being so shaped that the clutch member will be disengaged automatically from either bevel gear if said bevel gear is rotating in the wrong direction to transmit rotation in the desired single direction to said cam.

12. In a machine for producing gears, a frame, a work-spindle journaled in the frame, a full circular cradle journaled in the frame and adjustable thereon through an angle of 360°, a carrier mounted on the cradle for angular adjustment thereon about an axis parallel to the axis of the cradle, a head mounted on the carrier for angular adjustment thereon about an axis perpendicular to the axis of the carrier, a face mill gear cutter rotatably mounted on said head, means for rotating the cradle and work-spindle on their respective axes and means for rotating said cutter.

13. In a machine for producing gears, a frame, a circular cradle rotatably and adjustably mounted on the frame for movement and adjustment through an angle of 360°, a tool support mounted on said cradle for angular adjustment thereon in two different planes at right angles to one another, a spindle rotatably mounted on said tool support and adapted to carry a face mill gear cutter, means for adjusting said spindle axially on said tool support, a work support slidably adjustable on said frame in a direction axial of the axis of said cradle, a work spindle journaled in the work-support, means for rotating the cradle and work-spindle on their respective axes, and means for rotating the tool-spindle.

14. In a machine for producing gears, a frame, a circular cradle rotatably and adjustably mounted on the frame for movement and adjustment through an angle of 360°, a tool support mounted on said cradle for angular adjustment thereon about an axis intersecting the axis of the cradle, a spindle rotatably mounted on said tool support and adapted to carry a face mill gear cutter, means for adjusting said spindle axially on said tool support, a work support slidably adjustable on said frame in a direction axial of the axis of the cradle, a work spindle journaled in the work-support, means for rotating the cradle and work-spindle on their respective axes, and means for rotating the tool-spindle.

15. In a machine for producing gears, a frame, a circular cradle rotatably and adjustably mounted on the frame for movement and adjustment through an angle of 360°, a tool support mounted on said cradle for angular adjustment thereon about an axis extending parallel to the axis of the cradle, a spindle rotatably mounted on said tool support and adapted to carry a face mill gear cutter, means for adjusting said spindle axially on said tool support, a work support slidably adjustable on said frame in a direction axial of the axis of the cradle, a work spindle journaled in the work-support, means for rotating the cradle and work-spindle on their respective axes, and means for rotating the tool-spindle.

16. In a machine for producing gears, a work spindle, a continuously rotating member, a hollow drum connected to one of said parts and containing a liquid, an abutment member and a driving member movable into and out of engagement with the abutment member, one of said two members being carried by said drum and the other of said members being secured to that one of the first two mentioned parts to which the drum is not connected, and means for periodically moving the driving member into operative position relative to the abutment member to effect thereby periodic indexing of the work spindle, said driving and abutment members being of such dimensions that when the driving member is moved into operative position, fluid will be entrapped between the driving and abutment members to cushion their driving engagement.

17. In a machine for producing gears, a work spindle, gearing for rotating said work spindle, a hollow stationary drum containing a fluid, a stop-plate operatively connected to said gearing and extending into the chamber of said drum, a dog mounted on said drum for movement into the chamber thereof to engage said stop-plate to hold said gearing against rotation during cutting, said dog and stop-plate being of such dimensions that when the dog is moved into operative position, liquid will be entrapped between the two, means for rotating said gearing, when the dog is disengaged from the stop-plate to index the work spindle, and means for periodically disengaging said dog from said stop-plate and for thereafter returning said dog into operative position when the stop-plate is angularly displaced from locked-up position so that liquid is entrapped between the dog and stop-plate to cause cushioned stoppage of the stop-plate.

18. In a machine for producing gears, a work spindle, a train of gearing for rotating the work spindle including a differential, means for driving one element of the differential continuously, means for locking one element of the differential against rotation during cutting, a continuously rotating member, means for periodically releasing said second element of the differential and connecting said continuously rotating member thereto to effect indexing of the work spindle, and means for cushioning the connection of the continuously rotating member to the second differential element.

19. In a machine for producing gears, an abutment member, a driving member movable into and out of engagement therewith, a hollow drum within which both of said members are mounted, one of said members being secured to said drum, said drum containing a fluid, a work spindle and a continuously rotating member, means connecting the drum to one of the two last named parts, a train of gearing for rotating the work spindle including a differential, means for driving one element of the differential continuously, means for locking another element of the differential against rotation during cutting, and means for periodically releasing said second element of the differential and simultaneously moving said driving member into operative position with reference to said abutment member whereby to transmit rotation of the continuously rotating member to the work spindle through the second element of the differential, said abutment and driving members being of such dimensions that, when the driving member is moved into operative position, fluid will be entrapped between the driving and abutment members to cushion their driving engagement.

20. In a machine for producing gears, a work spindle, a train of gearing for rotating said spindle including a differential, means for driving one element of the differential continuously, means for locking a second element of the differential against rotation during cutting, means for driving the second element of the differential when released to index the work spindle, means for periodically releasing said locking means and simultaneously connecting said drive member to the second element of the differential to index the work spindle, means for disengaging the driving means again before the second element of the differential has returned to lock-up position, and means for then moving the second element of the differential back to locked-up position at a gradually reduced velocity.

21. In a machine for producing gears, a work spindle, a train of gearing for rotating said spindle including a differential, means for driving one element of the differential continuously, means for locking a second element of the differential against rotation during cutting, a drive member and a cam, means for actuating said drive member and cam continuously, means for periodically releasing said locking means and simultaneously connecting said drive member to the second element of the differential to index the work spindle, means for disengaging the drive member again before the second element of the differential has returned to locked-up position, a roller connected to the second element of the differential and positioned so as to be engaged and driven by said cam when the drive member has been disengaged, said cam being so shaped that the second differential element is returned to locked-up position by the cam at a gradually reduced velocity.

22. In a machine for producing gears, a work spindle, a train of gearing for rotating said spindle including a differential, means for driving one element of the differential continuously, a stop-plate connected to another element of the differential, a stationary hollow drum surrounding said stop-plate, a dog mounted on said stop-plate for movement into and out of the chamber of said drum for engagement with or disengagement from said stop-plate, said drum being adapted to contain a liquid and said dog and stop-plate being of such dimensions as to entrap liquid therebetween when the dog is moved into engagement while the cooperating surfaces of the dog and stop-plate are still spaced angularly apart, a continuously rotating member having a projection thereon, a second hollow drum surrounding said continuously rotating member, a second dog mounted on the second drum for movement into and out of the chamber of said second drum for engagement with or disengagement from the projection of the continuously rotating member, said second drum being adapted to contain a liquid and said second dog and projection being of such dimensions as to entrap liquid therebetween when the second dog is moved into engaging position while the cooperating surfaces of said second dog and projection are still spaced angularly apart, gearing connecting the two drums together, means constantly urging the dogs into operative positions and means movable alternately in opposite directions to disengage one of the dogs from operative position and simultaneously permit movement of the other dog into operative position under actuation of the last named means.

23. In a machine for producing gears, a frame, a work spindle journaled in the frame, a full circular cradle rotatably mounted in the frame for adjustment and movement thereon through an angle of 360°, a tool support mounted on said cradle for rectilinear adjustment thereon and for angular adjustment thereon also about two axes, one of which is parallel to the axis of the cradle and one of which is inclined thereto, a tool mounted on the tool support for movement in a longitudinally curved path across the face of a gear blank, means for rotating the work spindle and the cradle on their respective axes, and means for actuating the tool.

24. In a machine for producing gears, a frame, a work spindle journaled in the frame, a full circular cradle rotatably mounted on the frame and adjustable thereon through an angle of 360°, a carriage adjustable radially on the cradle, a carrier adjustable angularly on the carriage about an axis parallel to the axis of the cradle, a head adjustable angularly on the carrier about an axis perpendicular to the axis of the carrier, a face-mill gear cutter rotatably mounted on said head, means for rotating the cradle and work spindle on their respective axes and means for rotating said cutter.

25. In a machine for producing gears, a frame, a work spindle journaled in the frame, a full circular cradle rotatably mounted on the frame and adjustable thereon through an angle of 360°, a tool support mounted on said cradle for rectilinear adjustment thereon and for angular adjustment also thereon about two axes, one of which is parallel to the axis of the cradle and one of which is inclined thereto, a face-mill gear cutter rotatably mounted on the tool support, means for rotating the cradle and work spindle on their respective axes, and means for rotating the cutter.

LEONARD O. CARLSEN.